United States Patent
Hirano et al.

(10) Patent No.: US 9,061,787 B2
(45) Date of Patent: Jun. 23, 2015

(54) THREE-PIECE RESEALABLE CAN FOR ACIDIC LIQUID

(75) Inventors: Shigeru Hirano, Tokyo (JP); Hiroshi Nishida, Tokyo (JP); Hirokazu Yokoya, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 13/817,061

(22) PCT Filed: May 27, 2011

(86) PCT No.: PCT/JP2011/062193
§ 371 (c)(1),
(2), (4) Date: Feb. 14, 2013

(87) PCT Pub. No.: WO2012/042973
PCT Pub. Date: Apr. 5, 2012

(65) Prior Publication Data
US 2013/0146594 A1     Jun. 13, 2013

(30) Foreign Application Priority Data

| Sep. 29, 2010 | (JP) | 2010-218071 |
| Dec. 3, 2010 | (JP) | 2010-270183 |
| Dec. 3, 2010 | (JP) | 2010-270184 |

(51) Int. Cl.
*B65D 6/28* (2006.01)
*B65D 6/00* (2006.01)
(Continued)

(52) U.S. Cl.
CPC . *B65D 7/12* (2013.01); *C23C 28/00* (2013.01); *C25D 11/38* (2013.01); *B32B 15/09* (2013.01);
(Continued)

(58) Field of Classification Search
CPC .................. B65D 41/0464; B65D 41/0442

USPC ........ 220/611, 612, 62.17, 62.22, 610, 62.12; 215/327
See application file for complete search history.

(56) References Cited

U.S. PATENT DOCUMENTS 3,845,653 A * 11/1974 Hilgenbrink .................. 72/361
3,868,038 A *  2/1975 Hadley ........................ 215/305
(Continued)

FOREIGN PATENT DOCUMENTS

| EP | 0493119 | 7/1992 |
| EP | 2008938 | 12/2008 |

(Continued)

OTHER PUBLICATIONS

Chinese Office Action dated Jul. 18, 2013 issued in corresponding Chinese Application No. 201180041986.1. [With English Translation of Search Report].
(Continued)

*Primary Examiner* — Fenn Mathew
*Assistant Examiner* — Christopher McKinley
(74) *Attorney, Agent, or Firm* — Kenyon & Kenyon LLP

(57) ABSTRACT

A three-piece resealable can for acidic liquid includes, a cylindrical can body member that includes a screw portion at one end; and a can bottom member that contacts the can body member so as to close an opening portion of the other end of the can body member. The can body member includes a cylindrical first steel sheet, Ni plating that is formed on an inner circumferential surface of the first steel sheet, a polyester film that is formed so as to be disposed on the outermost surface of the inner circumference of the can body member, and a chromate film that is formed between the first steel sheet and the polyester film. The can bottom member includes a second steel sheet, and Sn plating that is formed on the can body member side of the can bottom member.

14 Claims, 10 Drawing Sheets

(51) Int. Cl.

| | | |
|---|---|---|
| *C23C 28/00* | (2006.01) | |
| *C25D 11/38* | (2006.01) | |
| *B32B 15/09* | (2006.01) | |
| *C25D 5/12* | (2006.01) | |
| *C25D 5/14* | (2006.01) | |
| *C25D 7/00* | (2006.01) | |
| *C23C 28/02* | (2006.01) | |
| *C25D 7/04* | (2006.01) | |
| *C25D 3/12* | (2006.01) | |
| *C25D 3/30* | (2006.01) | |

(52) U.S. Cl.
 CPC ......... *B32B 2311/16* (2013.01); *B32B 2311/30* (2013.01); *B32B 2439/70* (2013.01); *C25D 3/12* (2013.01); *C25D 3/30* (2013.01); *C25D 5/12* (2013.01); *C25D 5/14* (2013.01); *C25D 7/00* (2013.01); *C23C 28/321* (2013.01); *C23C 28/322* (2013.01); *C23C 28/3455* (2013.01); *C23C 28/023* (2013.01); *C25D 7/04* (2013.01)

(56) References Cited

U.S. PATENT DOCUMENTS

| | | | | |
|---|---|---|---|---|
| 4,054,227 | A | | 10/1977 | Saunders |
| 4,358,493 | A | * | 11/1982 | Ohtsuki et al. ............... 428/34.2 |
| 4,387,830 | A | * | 6/1983 | Kitamura et al. ........ 220/495.03 |
| 4,427,123 | A | * | 1/1984 | Komeda et al. .............. 215/12.2 |
| 4,471,883 | A | * | 9/1984 | Kitamura et al. ............. 220/680 |
| 4,517,256 | A | * | 5/1985 | Matsuno et al. ............. 428/629 |
| 4,735,835 | A | * | 4/1988 | Taira et al. ................... 428/35.8 |
| 4,916,031 | A | * | 4/1990 | Kitamura et al. ............. 428/626 |
| 4,936,482 | A | * | 6/1990 | Gallagher et al. ............ 220/802 |
| 5,595,322 | A | * | 1/1997 | Kramer ......................... 220/619 |
| 5,718,352 | A | * | 2/1998 | Diekhoff et al. ............. 220/669 |
| 7,171,840 | B2 | * | 2/2007 | Kanou et al. ................. 72/379.4 |
| 2005/0218140 | A1 | * | 10/2005 | Enoki et al. ................ 220/62.22 |
| 2009/0277862 | A1 | * | 11/2009 | Masuda et al. ............... 215/329 |
| 2012/0067905 | A1 | * | 3/2012 | Takahara et al. ............. 220/610 |

FOREIGN PATENT DOCUMENTS

| | | |
|---|---|---|
| EP | 2589685 | 5/2013 |
| JP | 62-122936 | 6/1987 |
| JP | 03-049628 | 7/1991 |
| JP | 05-032256 | 2/1993 |
| JP | 06-135441 | 5/1994 |
| JP | 06-218462 | 8/1994 |
| JP | 07-002998 | 1/1995 |
| JP | 07-156953 | 6/1995 |
| JP | 10-317165 | 12/1998 |
| JP | 2000-080499 | 3/2000 |
| JP | 2006-151427 | 6/2006 |
| JP | 2006-341851 | 12/2006 |
| JP | 2007-231394 | 9/2007 |
| TW | 200740659 | 11/2007 |

OTHER PUBLICATIONS

International Search Report dated Jul. 19, 2011 issued in corresponding PCT Application No. PCT/JP2011/062193.

Search Report dated Sep. 4, 2014 issued in corresponding European Application No. 11828535.2.

* cited by examiner

THREE-PIECE RESEALABLE CAN FOR ACIDIC LIQUID

FIELD OF THE INVENTION

The present invention relates to a three-piece resealable can which can store acidic liquid, particularly acidic beverages such as fruit juice with high quality.

This application is a national stage application of International Application No. PCT/JP2011/062193, filed May 27, 2011, which claims priority to Priority is claimed on Japanese Patent Application No. 2010-218071, filed Sep. 29, 2010, Japanese Patent Application No. 2010-270183, filed Dec. 3, 2010, and Japanese Patent Application No. 2010-270184, filed on Dec. 3, 2010, the contents of which are incorporated herein by reference.

DESCRIPTION OF RELATED ART

A three-piece resealable can is mostly configured of a can body member, a can bottom member, and a cap. The can body member is a steel sheet on which a PET film is laminated in advance except for portions to be welded. The steel sheet is rounded in a cylindrical shape, the portions to be welded overlap with each other only by 0.3 to 0.6 mm, electric resistance welding is performed on the portions, and therefore, a cylindrical can body is manufactured.

Flanging is performed on a lower portion of a can body and a bottom cover (a can bottom member) is provided on the lower portion. On the other hand, in order to provide the cap on an upper portion of the can body, after necking, threading is performed so that resealability due to the cap is realized. The threading is a forming in which rotating dies are pressed to the inner surface and the outer surface of the can body and a shape of a thread and groove of the screw is formed in a circumferential direction of the can body. However, at this time, a large shearing force is generated in the circumferential direction at the place where the dies abut. Thereby, it is necessary to secure adhesiveness so that the laminated film is not peeled from the body material (steel sheet) by the shearing force. In this way, the cap made of aluminum on which the threading is performed can be screw-capped around the place subjected to the threading. Moreover, a method is known in which a cap which does not have no thread is covered on the can before the threading is performed, dies are pressed onto the cap, and the threading is performed on the can main body and the cap together (for example, refer to Patent Citation 1).

In the body material of a general three-piece can, a steel sheet such as a tinplate in which a portion of Sn is alloyed by reflow (melting treatment of Sn) after Sn is plated is preferably used (for example, refer to Patent Citations 2 to 7). However, a Ni-plated steel sheet without using Sn is also used (for example, refer to Patent Citation 8). Since acidic beverages such as fruit juice have relatively high corrosiveness, an Sn-plated steel sheet in which unalloyed Sn performs a sacrificial protection with respect to an iron matrix tends to be used for the acidic beverages. On the other hand, a Ni-plated steel sheet is applied for beverages having relatively low corrosiveness. Moreover, since the Ni-plated steel sheet has significantly improved film adhesiveness, particularly, the adhesiveness in the formed portion compared to the Sn-plated steel sheet, the Ni-plated steel sheet is used for a member obtained by high deformation.

PATENT CITATION

[Patent Citation 1] Japanese Unexamined Patent Application, First Publication No. 2006-341851
[Patent Citation 2] Japanese Unexamined Patent Application, First Publication No. H6-135441
[Patent Citation 3] Japanese Unexamined Patent Application, First Publication No. 116-218462
[Patent Citation 4] Japanese Unexamined Patent Application, First Publication No. H7-156953
[Patent Citation 5] Japanese Unexamined Patent Application, First Publication No. H5-32256
[Patent Citation 6] Japanese Examined Patent Application, Second Publication No. H7-2998
[Patent Citation 7] Japanese Examined Patent Application, Second Publication No. H3-49628
[Patent Citation 8] Japanese Unexamined Patent Application, First Publication No. 2000-80499

SUMMARY OF THE INVENTION

Problems to be Solved by the Invention

When the acidic beverages are filled into the three-piece resealable can, from the viewpoint of corrosion resistance, the Sn-plated steel sheet is optimal for the body material. However, when the threading is performed on the can body, the layer of the unalloyed Sn is deformed by a large shearing force, adhesiveness between the Sn plating and the film is damaged, and film wrinkles or film peeling are easily generated. Moreover, the alloy Sn (alloyed Sn) has improved adhesiveness, but the corrosion resistance with respect to the acidic beverage is not sufficient. On the other hand, in the Ni-plated steel sheet, the problem of the above-described film peeling is not substantially generated. However, since the corrosion resistance with respect to the acidic beverages is not sufficient, the function as a can may be decreased. Thereby, a laminated three-piece resealable can capable of filling the acidic beverages is required.

Under such circumstances, an object of the present invention is to provide a three-piece resealable can which has improved weldability, film adhesiveness, and corrosion resistance and can store acidic beverages such as fruit juice with high quality.

Methods for Solving the Problem

The inventors found that progress of the corrosion could be suppressed even though acidic beverages were filled into a can by using an Sn-plated steel sheet (for example, no coating and no film) in which a sacrificial protection could be used by Sn on a bottom cover of a laminated three-piece resealable can for securing corrosion resistance, and by using a Ni-plated steel sheet including a polyester film (for example, a PET film) in a body material of the can for securing film adhesiveness during forming. Moreover, when at least a portion of the Ni-plated steel sheet which is used in the body material of the can further includes alloyed Sn plating, Sn in the Sn plating has an effect which further suppresses the corrosion through the polyester film.

The corrosion in the can rapidly progresses due to oxygen which is mixed in at the time of filling of the beverage and gradually proceeds after the oxygen is consumed. That is, the inventors found the following. In an initial stage of the corrosion, the oxygen in the can was consumed by the sacrificial protection of Sn. After the oxygen was consumed, since the corrosion rate was significantly decreased even in the Ni-plated steel sheet which was easily applied to a low-corrosive beverage and had relatively low corrosion resistance, in practical use, a sufficient life span could be secured.

The summary of the present invention is as follows.

(1) A three-piece resealable can for acidic liquid according to an aspect of the present invention includes: a cylindrical can body member that includes a screw portion at one end; and a can bottom member that contacts the can body member so as to close an opening portion of the other end of the can body member wherein the can body member includes a cylindrical first steel sheet, Ni plating that is formed on an inner circumferential surface of the first steel sheet, a polyester film that is formed so as to be disposed on the outermost surface of an inner circumference of the can body member, and a chromate film that is formed between the first steel sheet and the polyester film, wherein the amount of Ni plating is 10 to 1000 mg/m$^2$, the amount of chromate film is 2 to 30 mg/m$^2$ expressed in terms of Cr metal, and the amount of metal plating which is closest to the outermost surface of the inner circumference of the can body member is 200 to 4000 mg/m$^2$, wherein the can bottom member includes a second steel sheet, and Sn plating that is formed on the can body member side of the can bottom member, the Sn plating being on or above the second steel sheet, and wherein the Sn plating includes Sn single metal plating in the amount of 2 to 20 g/m$^2$.

(2) In the three-piece resealable can for acidic liquid according to (1), the outermost surface on the can body member side on the can bottom member may be the Sn plating.

(3) In the three-piece resealable can for acidic liquid according to (1), the can bottom member may further include a chromate film which is formed on a surface of the Sn plating, the amount of chromate film being 2 to 10 mg/m$^2$ expressed in terms of Cr metal, and the outermost surface of the can bottom member being the chromate film.

(4) In the three-piece resealable can for acidic liquid according to any one of (1) to (3), the Sn plating of the can bottom member may include alloyed Sn plating in the amount of 0.2 to 1.5 g/m$^2$.

(5) In the three-piece resealable can for acidic liquid according to any one of (1) to (4), the can bottom member may further include Ni plating in the amount of 10 to 200 mg/m$^2$ which is formed on the surface on the can body member side on the second steel sheet.

(6) In the three-piece resealable can for acidic liquid according to any one of (1) to (5), the can bottom member may further include Ni plating in the amount of 10 to 200 mg/m$^2$ which is formed on the surface on the can body member side of the second steel sheet.

(7) In the three-piece resealable can for acidic liquid according to any one of (1) to (6), the amount of Ni plating of the can body member may be 200 to 1000 mg/m$^2$ and the amount of chromate film of the can body member may be 2 to 10 mg/m$^2$ expressed in terms of Cr metal.

(8) In the three-piece resealable can for acidic liquid according to any one of (1) to (6), the can body member may further include Sn plating which is formed on the surface of the Ni plating, the Sn plating including Sn single metal plating in 0.2 to 2 g/m$^2$ and alloyed Sn plating, the amount of Ni plating of the can body member being 10 to 200 mg/m$^2$, and the amount of chromate film of the can body member being 10 to 30 mg/m$^2$.

(9) In the three-piece resealable can for acidic liquid according to any one of (1) to (8), the can body member may further include an adhesive layer between the chromate film and the polyester film.

(10) In the three-piece resealable can for acidic liquid according to (9), the adhesive layer may contain 100 to 3600 mg/m$^2$ of Sn metal particles having a mean particle diameter of 2 to 7 μm with respect to the surface area of the first steel sheet.

(11) In the three-piece resealable can for acidic liquid according to (10), the mean particle diameter of the Sn metal particles may be 3 to 6 μm.

(12) In the three-piece resealable can for acidic liquid according to (10) or (11), the adhesive layer may contain 300 to 2000 mg/m$^2$ of the Sn metal particles with respect to the surface area of the first steel sheet.

(13) In the three-piece resealable can for acidic liquid according to any one of (1) to (12), the resistance between the can body member and the can bottom member may be 1Ω or less.

(14) In the three-piece resealable can for acidic liquid according to (13), the resistance between the can body member and the can bottom member may be 0.1Ω or less.

Effects of the Invention

According to the present invention, the three-piece resealable can which has improved weldability, film adhesiveness, and corrosion resistance and can store acidic beverages such as fruit juice with high quality can be provided.

DETAILED DESCRIPTION OF THE INVENTION

Figure 1A:
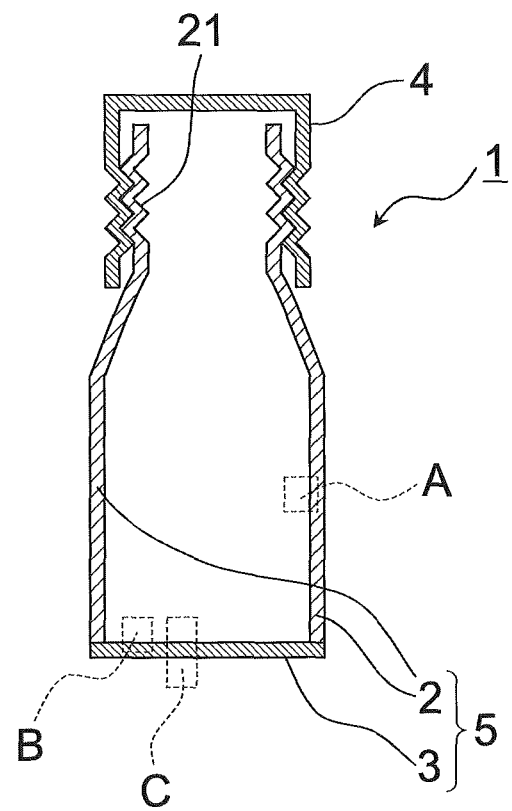
FIG. 1A is a schematic longitudinal cross-sectional view of a resealable can according to an embodiment of the present invention.

Hereinafter, embodiments of the present invention will be described in detail.

A method of manufacturing a sheet (steel sheet) to be plated which is used in the present embodiment, the material of the sheet, or the like are not particularly limited. That is, a general slab (slab subjected to general refining and casting) is subjected to processes such as hot rolling, pickling, cold rolling, annealing, and skin pass rolling, and the sheet to be plated is manufactured.

[Ni-Plated Steel Sheet (Can Body Member)]

First, a case where a can body member uses a Ni-plated steel sheet will be described.

When Ni plating is performed on a sheet to be plated, generally, degreasing and pickling are performed as a pretreatment for cleaning the surface of the sheet to be plated. However, the possible methods are not particularly limited. For example, after the sheet to be plated is degreased in 10% sodium hydroxide, electrolytic pickling with respect to the sheet may be performed in 5% sulfuric acid solution. Sequentially after the degreasing and the pickling, the Ni plating is electrically performed on the sheet to be plated. The method of the Ni plating is also not particularly limited. For example, the Ni plating may be performed at a current density of 1 to 5 $A/dm^2$ in a solution of 30 to 45° C. and about pH 4 which contains Ni ions at 20 to 40 g/L using Ni sulfate and boric acid. The object which performs the Ni plating is to secure weldability, corrosion resistance, and adhesiveness after forming. Ni has characteristics in which a solid-state bonding is easily performed by forge welding, and therefore, improved weldability can be exerted by the Ni plating. The improvement of the weldability due to the solid-state bonding begins to be exerted when the amount of Ni plating is 200 $mg/m^2$ or more and gently increases according to an increase in the amount of Ni plating. However, if the amount of Ni plating exceeds 1000 $mg/m^2$, the improved weldability approaches a limit, which is economically disadvantageous. Thereby, in the case of obtaining the improvement of the weldability due to the solid-state bonding, it is preferable that the amount of Ni plating be 200 to 1000 $mg/m^2$.

Moreover, Ni exerts more improved adhesiveness after forming through a synergistic effect with a chromate coating film. The film (chromate film) formed by the chromate treatment mainly contains hydrated Cr oxide which is firmly adhered to a film (for example, a polyester film) by hydrogen bonds. The improved adhesiveness begins to be exerted when the amount of chromate film is 2 $mg/m^2$ or more expressed in terms of chromium metal and gently increases according to an increase in the amount of chromate film. On the other hand, since the chromate film has an insulating property compared to the metal plating, if the amount of chromate film is too high, the current required in the welding becomes unstable, and expulsion according to local heating is easily generated. Thereby, the amount of chromate film needs to be 30 $mg/m^2$ or less expressed in terms of chromium metal, and is preferably 10 $mg/m^2$ or less. Particularly, in the Ni-plated steel sheet, since the chromate film is directly formed on the surface of Ni plating, considering affinity or the like between the Ni plating and the chromate film, it is preferable that the chromate film be 2 to 10 $mg/m^2$. The method of applying the chromate film is not particularly limited. For example, the chromate film may be obtained by performing cathode electrolysis at a current density of 1 to 5 $A/dm^2$ in a solution of 100 g/L of chromic acid and 1 g/L of sulfuric acid.

[Sn-Plated Steel Sheet (Can Bottom Member)]

Next, a can bottom member which uses an Sn-plated steel sheet will be described.

Also when Sn plating is performed, similarly to the Ni plating, degreasing and pickling are performed as a pretreatment for cleaning the surface of the sheet to be plated. However, the method is not particularly limited. For example, after the sheet to be plated is degreased in 10% sodium hydroxide, electrolytic pickling with respect to the sheet may be performed in 5% sulfuric acid solution. Sequentially after the degreasing and the pickling, the Sn plating is electrically performed on the sheet to be plated. The method of the Sn plating is also not particularly limited. For example, the Sn plating may be performed at 35 to 45° C. and a current density of 1 to 5 $A/dm^2$ in an acid solution of about pH 1 which contains Sn ions at 15 to 30 g/L using sulfuric acid and Sn sulfate.

The object of using the Sn-plated steel sheet as the can bottom member is to secure corrosion resistance. In containers into which acidic beverages (acidic liquid) are filled, Sn provides a sacrificial protection with respect to the iron matrix. Particularly, just after the filling, that is, in the initial stage of corrosion, oxygen in the can which promotes the corrosion and Sn react with each other, and corrosion resistance is secured. The improvement of the corrosion resistance due to Sn begins to be exerted when the amount of Sn single metal plating in the Sn plating is 2 $g/m^2$ or more, and the corrosion resistance gently increases according to an increase in the amount of Sn plating. However, if the amount of Sn single metal plating exceeds 20 $g/m^2$, the improved corrosion resistance approaches a limit, which is economically disadvantageous. Thereby, the amount of Sn single metal plating is limited to 2 to 20 $g/m^2$. In order to secure more sufficient corrosion resistance (for example, corrosion resistance in the longer term), the amount of Sn single metal plating is preferably 5 $g/m^2$ or more, and is more preferably 8 $g/m^2$ or more. Moreover, in order to use the Sn plating as efficiently as possible, the amount of Sn single metal plating is preferably 16 $g/m^2$ or less and is more preferably 15 $g/m^2$ or less. Moreover, the Sn single metal plating is defined as Sn plating in which alloying is not applied after the Sn plating, and the amount of Sn single metal plating is estimated as an amount independent from the amount of alloyed Sn plating described below. Thereby, Sn single metal plating may include other elements through a plating bath.

In an Sn-plating layer (Sn plating) just after the plating is performed, invisible micro pinholes are present and the iron matrix may be exposed. Thus, the pinholes are removed by performing reflow (reflow of Sn) after the Sn plating, and the corrosion resistance can be improved. In addition, in this case, since an alloyed Sn layer (alloyed Sn plating) having improved corrosion resistance compared to pure Sn is formed, Sn (Sn in the Sn single metal plating) is dissolved by a sacrificial protection effect, corrosion of the place in which the Sn-plating layer is thinned is prevented, and dissolution of iron (iron matrix) can be suppressed. The improvement of the corrosion resistance due to the Sn alloy layer begins to be exerted when the amount of alloyed Sn plating is 0.2 g/m$^2$ or more expressed in terms of Sn metal, and the corrosion resistance gently increases according to an increase in the amount of alloyed Sn plating. However, if the amount of alloyed Sn plating exceeds 1.5 g/m$^2$ expressed in terms of Sn metal, the improved corrosion resistance approaches a limit, which is economically disadvantageous. Accordingly, it is preferable that the amount of alloyed Sn plating be 0.2 to 1.5 g/m$^2$ expressed in terms of Sn metal. The method of reflow is not particularly limited, and an apparatus which can heat up to a temperature which exceeds a melting point of Sn may be used. For example, the reflow may be performed by electrical heating, induction heating, or heating in an electrical furnace. Moreover, the amount of alloyed Sn plating is estimated as an amount independent from the amount of Sn single metal plating.

In addition, in the Sn-plated steel sheet which is used in the can bottom member, the Ni plating may be performed before the Sn plating is performed. In this case, the Sn plating is formed on the Ni plating, and the appearance of the alloyed Sn plating can be silver-white. Generally, since Sn alloy forms a coarse surface of columnar crystals, the appearance is gray or black. However, if the alloyed Sn plating is formed on the Ni plating, since crystals of the Sn alloy become fine and are more densely precipitated, the appearance becomes silver-white. The improvement of the appearance due to Ni begins to be exerted when the amount of Ni plating is 10 mg/m$^2$ or more and gently increases according to an increase in the amount of Ni plating. However, if the amount of Ni plating exceeds 200 mg/m$^2$, the improved appearance approaches a limit, which is economically disadvantageous. Thereby, when the Ni plating is performed on the can bottom member, it is preferable that the amount of Ni plating be 10 to 200 mg/m$^2$. The method of the Ni plating is not particularly limited. For example, the above-described method of the Ni plating may be used, and Ni—Fe alloy plating may be formed as the Ni plating. For example, the Ni—Fe alloy plating may be formed by plating at a current density of 1 to 5 A/dm$^2$ in a solution of 30 to 45° C. and about pH 2 to 3 which contains Ni and Fe ions at 20 to 40 g/L using Fe sulfate, Ni sulfate, and boric acid.

Sequentially after the Sn plating, a chromate treatment may be performed in order to secure the adhesiveness between the can and coating or the like. It is preferable that a surface corresponding to the inner surface of the can of the Sn-plated steel sheet be used in the can bottom member without being subjected to the chromate treatment. However, a simple coating is applied to a surface corresponding to the outer surface of the can of the Sn-plated steel sheet in order to secure corrosion resistance (rustproofness) and slidability. Thereby, it is preferable that a chromate film be formed on the surface corresponding to the outer surface of the can of the Sn-plated steel sheet so as to improve coating properties. That is, the coating (chromate film) formed by the chromate treatment mainly contains hydrated Cr oxide which is firmly adhered to a coating material by hydrogen bonds. The improved adhesiveness begins to be exerted when the amount of chromate film is 2 mg/m$^2$ or more expressed in terms of chromium metal, and the adhesiveness gently increases according to an increase in the amount of chromate film. However, if the amount of chromate film exceeds 10 mg/m$^2$, the improved adhesiveness approaches a limit, which is economically disadvantageous. Thereby, it is preferable that the amount of chromate film be 2 to 10 mg/m$^2$ or less expressed in terms of chromium metal. Moreover, if the amount of chromate film is within this range, even when the chromate film is formed on the surface corresponding to the inner surface of the can of the can bottom member, the improvement of corrosion resistance due to Sn (sacrificial protection effect) can be sufficiently maintained. Thereby, the chromate film may be formed on both surfaces of the Sn-plated steel sheet. In this case, the chromate treatment can be simply performed. In addition, the method of applying the chromate film is not particularly limited. For example, the chromate film can be obtained by performing cathode electrolysis at a current density of 1 to 5 A/dm$^2$ in a solution of 40 g/L sodium dichromate at pH 4.

[Sn-Plated Steel Sheet (Can Body Member)]

Moreover, the can body member which uses an Sn-plated steel sheet will be described.

In the Sn-plated steel sheet which is used in the can body member, it is necessary to perform the Ni plating before the Sn plating. The method of the Ni plating is not particularly limited. For example, the above-described method of the Ni plating may be used, and Ni—Fe alloy plating may be formed as the Ni plating. For example, the Ni—Fe alloy plating may be formed by being performed at a current density of 1 to 5 A/dm$^2$ in a solution of 30 to 45° C. and about pH 2 to 3 which contains Ni and Fe ions at 20 to 40 g/L using Fe sulfate, Ni sulfate, and boric acid.

The object of performing the Ni plating before the Sn plating is to secure corrosion resistance and adhesiveness. Since the Ni is a metal having an excellent corrosion resistance, the corrosion resistance of the Sn alloy layer (alloyed Sn plating) containing Ni formed by the reflow can be improved. Moreover, if the Ni plating is performed before the Sn plating, Sn which is melted by the reflow is easily repelled, the amount of exposed portions of alloyed Sn layer having improved film adhesiveness increases, and the amount of exposed portions of unalloyed Sn decreases. Therefore, the film adhesiveness at the formed portion can be secured. The effect of Ni begins to be exerted when the amount of Ni plating is 10 mg/m$^2$ or more and gently increases according to an increase in the amount of Ni plating. However, if the amount of Ni plating exceeds 200 mg/m$^2$, the film adhesiveness approaches a limit, which is economically disadvantageous. Therefore, it is preferable that the amount of Ni plating be 10 to 200 mg/m$^2$.

The role of Sn in the Sn-plated steel sheet which is used in the can body member is to secure weldability. Since Sn has an effect which decreases contact resistance, electric resistance welding can be easily performed with respect to the Sn-plated steel sheet. The improvement of weldability due to the presence of Sn begins to be exerted when the amount of a single metal plating in the Sn plating is 0.2 g/m$^2$ or more and the weldability gently increases according to an increase in the amount of Sn single metal plating. Moreover, if the amount of Sn single metal plating is 2 g/m$^2$ or less, according to the above-described effect of the Ni plating, the amount of exposed portions of alloyed Sn plating after a reflow described below can be sufficiently secured, and the film adhesiveness can be improved. Accordingly, in the case of obtaining the effect which improves the weldability due to the decrease in the contact resistance, it is preferable that the amount of Sn single metal plating be 0.2 to 2 g/m$^2$. Moreover, the amount of Sn single metal plating is estimated as an amount independent from the amount of alloyed Sn plating described below.

In addition, in order to secure the adhesiveness, the above-described reflow is performed. In the reflow, if the amount of the formed alloyed Sn plating is 0.2 g/m² or more expressed in terms of Sn metal, the adhesiveness (film adhesiveness) begins to improve, and the adhesiveness gently increases according to an increase in the amount of alloyed Sn plating. However, if the amount of alloyed Sn plating increases excessively, it is difficult for a hard Sn alloy layer to deform properly during processing such as threading, damage such as cracks is generated in the Sn alloy layer, and the adhesiveness or the corrosion resistance may be significantly deteriorated. Thereby, the amount of alloyed Sn plating is preferably 2 g/m² or less and more preferably 1 g/m² or less, which are expressed in terms of Sn metal. In this way, it is preferable that the amount of alloyed Sn plating be 0.2 to 2 g/m². The amount of alloyed Sn plating can be controlled by adjusting a temperature or time during the reflow. The method of the reflow is not particularly limited. Industrially, the reflow may be performed by electrical heating, induction heating, or heating in an electrical furnace. Moreover, the amount of alloyed Sn plating is estimated as an amount independent from the amount of Sn single metal plating.

Sequentially after the Sn plating, the chromate treatment is performed in order to secure improved film adhesiveness (adhesiveness after forming) during forming. The coating (chromate film) formed by the chromate treatment mainly contains hydrated Cr oxide and Cr metal which are firmly adhered to a film by hydrogen bonds. The improved adhesiveness after forming begins to be exerted when the amount of chromate film is 2 mg/m² or more expressed in terms of chromium metal and the adhesiveness after forming gently increases according to an increase in the amount of chromate film. On the other hand, since the chromate film has an insulating property compared to the metal plating, if the amount of chromate film is too high, a current required in the welding becomes unstable, and expulsion according to local heating is easily generated. Thereby, the amount of chromate film needs to be 30 mg/m² or less expressed in terms of chromium metal. Particularly, in the Sn-plated steel sheet, since the chromate film is directly formed on the surface of the Sn plating, in view of an affinity or the like between the Sn plating and the chromate film, it is preferable that the amount of chromate film be 10 to 30 mg/m². The method of applying the chromate film is not particularly limited. For example, the chromate film may be obtained by performing cathode electrolysis at a current density of 10 to 40 A/dm² in a solution of 100 g/L of chromic acid and 1 g/L of sulfuric acid.

The three-piece resealable can is manufactured using either the Ni-plated steel sheet for the can body member or the Sn-plated steel sheet for the can body member and the Sn-plated steel sheet for the can bottom member. The method of manufacturing the three-piece resealable can is not particularly limited. For example, the method of manufacturing the three-piece resealable can may use the method disclosed in Patent Citation 1.

Moreover, in the embodiment, as the Sn-plated steel sheet configuring the bottom cover, an Sn-plated steel sheet in which an organic coating is not applied to a surface corresponding to the inner surface of the can is used. Here, the organic coating is defined as a general coating film (organic coating film) or laminate resin film which is used in a can main body. That is, in the embodiment, because a defective portion of the can body is protected by the sacrificial protection due to the Sn plating in which the organic coating is not formed in at least the portion in which the inner surface of the can in the bottom cover contacts the contents of the can.

Moreover, in order to further enhance the adhesiveness between the polyester film and the chromate film, an adhesive layer may be formed between the chromate film and the polyester film (on the chromate film of the can body member). The adhesive resin which is used in the adhesive layer is not particularly limited, and may be an adhesive which is generally used in order to laminate a resin film on the steel sheet. The adhesive resin may use either a thermoplastic resin or a thermosetting resin. However, from the viewpoint of heat resistance, it is preferable that the thermosetting resin be used.

For example, the thermosetting resin may include a composition or the like in which a hardening agent such as a melamine resin or an isocyanate resin is added to at least one kind selected from a polyester-based resin, an urethane-based resin, an epoxy-based resin, an acryl-based resin, an amino-based resin, a phenol-based resin, and the like, or at least one kind of these resins.

Moreover, a white pigment may be added to the adhesive layer and the adhesive layer may include 20 to 80 wt. % of inorganic pigments such as titanium oxide or mica.

Moreover, as the polyester film which is used in the can body member, films such as polyethylene naphthalate or polyethylene terephthalate (PET) are used. However, among these, a film (PET film) containing the polyethylene terephthalate as a main chemical component is preferably used. In order to secure dimensional stability with respect to heat treatment, generally, the polyester film uses a biaxially stretched film. The thickness of the film is not particularly limited. However, a film having the thickness of about 8 to 250 μm may be used, for example, from the viewpoint of costs, handling properties, and the formability, and the film having a thickness of 12 to 25 μm may be preferably used.

As described above, the inventors found that the corrosion resistance of the can main body could be secured using the Sn-plated steel sheet, in which the sacrificial protection due to Sn could be used, in the bottom cover of the laminated three-piece resealable can. Moreover, as described below, the inventors found that it was very important to decrease the resistance between the can bottom and the can body of the can main body after securing the film adhesiveness during forming by using the Ni-plated steel sheet as a material of the can body in order to suppress the corrosion of the can main body after filling acidic liquid.

Another point of the embodiment is to decrease (for example, to 1Ω or less) the resistance between the bottom cover (can bottom member) and the can body (can body member) in the can main body. Generally, from the viewpoint of preventing bimetallic corrosion, it is considered to be preferable that the resistance between the bottom cover and the can body be high. However, in the three-piece resealable can for acidic liquid of the embodiment, since the sacrificial protection of the can body is performed by the Sn plating of the can bottom, the resistance between the bottom cover and the can body is preferably 1Ω or less and is more preferably 0.1Ω or less.

In this way, when the resistance between the bottom cover and the can body is 1Ω or less, the inventors found that a cell could be formed between Sn of the bottom cover and Ni or Fe of the can body, the sacrificial protection effect of Sn was sufficiently exerted, and the corrosion of the can body portion could be suppressed.

The method of decreasing the resistance between the can cover and the can body is not particularly limited. In the embodiment, on the surface of the can cover corresponding to the inner surface side of the can main body, an organic film is not used except for a sealing compound which is applied to a seamed portion for securing sealing performance. Thereby, for example, as the method of decreasing the resistance, there is a method in which the organic film of the can body portion contacting the can cover portion other than the area to which the sealing compound is applied when the can bottom member is seamed to the can body member is removed mechanically, physically, or chemically.

In addition, for example, there is a method in which the sealing compound is applied only to the inner side (the inner side with respect to a general position) with respect to a sealing panel (can bottom member). Moreover, for example, when a shear blanking of the can body member is performed, there is method in which the shear is performed so that a burr protrudes in a direction of the can outer surface in a can end of the can body member on the side seaming the can cover. In this case, since the metal portion of the burr and the can bottom member easily contact each other, even though the organic film on the outer surface side of the can body is not removed, an electric connection between the can body member and the can bottom member can be secured.

In addition, as described below, the inventors found that progress of the corrosion after acidic beverages were filled could be suppressed while the film adhesiveness was secured during the forming due to the fact that Sn metal particles having a specific particle diameter (particle size) were contained in the adhesive layer between the Ni-plated steel sheet and the polyester film at a specific ratio. That is, the inventors found that if Sn metal particles were used in the can body member, oxygen in the can and particles of the metal Sn reacted with each other and oxygen in the can was consumed in an initial stage of corrosion, the corrosion rate decreased significantly even in the Ni-plated steel sheet which was easily applied to beverages having low corrosiveness after the oxygen was consumed, and in practical use, sufficient film adhesiveness and can life span could be secured. In this case, both the sacrificial protection effect due to Sn of the can bottom member and the sacrificial protection effect due to Sn of the adhesive layer in the can body member can be obtained, and long-term corrosion resistance of the can main body can be realized.

Still another point of the embodiment is that the adhesive layer of the surface corresponding to at least the inner surface of the can in a laminate steel sheet (Ni-plated steel sheet) of a resin film for a can includes Sn metal particles having a mean particle diameter of preferably 2 to 7 μm, more preferably 3 to 6 μm, in preferably 100 to 3600 mg/m², more preferably 300 to 2000 mg/m² per surface area of the steel sheet.

First, an advantage when Sn metal particles are contained in the adhesive layer will be described.

In an atmosphere inside the can into which acidic beverages are filled, tin (Sn) is baser than iron (Fe) or nickel (Ni), and is oxidized earlier than the nickel or iron. Just after the filling, that is, in the initial stage of the corrosion, oxygen inside the can promotes the corrosion. Due to the fact that the oxygen inside the can reacts with the Sn metal particles, the corrosion of the steel sheet after the reaction can be delayed and the corrosion resistance is secured. Moreover, when only Sn is plated on the steel sheet and the Sn-plated steel sheet in which alloying is not performed is used in the can body member, as described above, the film is easily separated in a formed portion (screw formed portion) such as a screw.

The reason why it is preferable that the mean particle diameter of Sn metal particles be 2 to 7 μm will be described.

When the mean particle diameter of the Sn metal particles is less than 2 μm, there is a tendency of making the appearance darker. Therefore, when a good appearance of the inner surface of the can main body is required, it is preferable that the mean particle diameter of the Sn metal particles be 2 μm or more. In addition, it is considered that the decrease in the brightness of the appearance is due to effects of the increase in scattering frequency of light according to the increase in the number of particles. Moreover, when the mean particle diameter of the Sn metal particles exceeds 7 μm, in the adhesive layer having the average thickness of about 5 μm or less, in a case where only the diameter of the particles of the metal Sn increases while the thickness of the adhesive layer is not changed, air is caught in an adhesive interface, it is difficult to secure sufficient adhesiveness between the adhesive layer and the steel sheet (Ni-plated steel sheet) or the adhesive layer and a resin film (polyester film). Moreover, in this case, the Sn metal particles themselves are deformed during forming, for example, the adhesiveness of the screw formed portion easily decreases. Therefore, the mean particle diameter of the Sn metal particles is preferably 2 to 7 μm and is more preferably 3 to 6 μm.

In addition, the mean particle diameter of the Sn metal particles which are used in the embodiment is a value which is measured by a laser diffraction particle size analyzer (SALD-2000) manufactured by Shimadzu Corporation).

Next, the reason why it is preferable that the amount of Sn metal particles which are contained in the adhesive layer be 100 to 3600 mg/m² per surface area of the steel sheet will be described.

If the amount of Sn metal particles is 100 mg/m² or more per surface area of the steel sheet, the corrosion resistance of the can body member can be further enhanced. Moreover, when the amount of Sn metal particles is 3600 mg/m² or less per surface area of the steel sheet, since the color tone of the coated film (polyester film and adhesive layer) can be brightly maintained, the appearance in the inner surface of the can is improved. Moreover, in this case, the film adhesiveness of the screw formed portion can be sufficiently secured.

Therefore, the amount of Sn metal particles which are contained in the adhesive layer is preferably 100 to 3600 mg/m² and more preferably 300 to 2000 mg/m² per surface area of the steel sheet.

In addition, the configuration of the three-piece resealable can (hereinafter, referred to as a "resealable can") for acidic liquid of the embodiment will be further described with reference to the accompanying drawings.

FIG. 1A is a schematic longitudinal cross-sectional view of the resealable can of the embodiment. As shown in FIG. 1A, the resealable can 1 of the embodiment includes a cylindrical can body member 2 which includes a screw portion (screw formed portion) 21 at one end, a can bottom member 3 which contacts the can body member 2 so as to close an opening portion of the other end of the can body member 2, and a cap 4 which is screwed to the screw portion 21 of the can body member 2. As described above, the end of the can body member 2 and the end of the can bottom member 3 are seamed to each other, the lower portion of the resealable can 1 is sealed, and a can main body 5 is formed. Similarly, the cap 4 is screwed to the can body member 2, and therefore, the upper portion of the resealable can 1 is closed to be resealable.

Moreover, it is preferable that the shape of the resealable can 1 satisfy the above-described configuration. However, the shape of the resealable can is not limited to the shape of FIG. 1A. Generally, aluminum is used in the material of the cap 4. However, if effects of the embodiment are not damaged, any material (for example, the same material as that of the can body member 2) may be used.

Figure 1B:
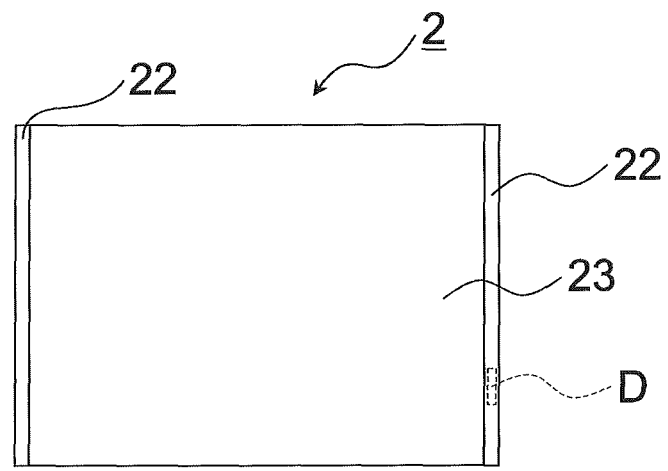
FIG. 1B is a schematic view of a can body member when viewed from a direction perpendicular to the sheet surface before the resealable can is manufactured.
Figure 1C:
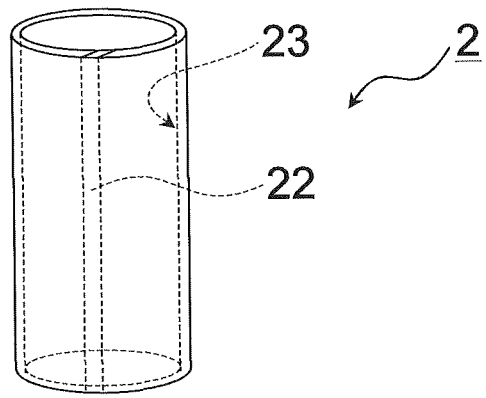
FIG. 1C is a schematic perspective view showing the can body member after a welding portion is welded.
Figure 1D:
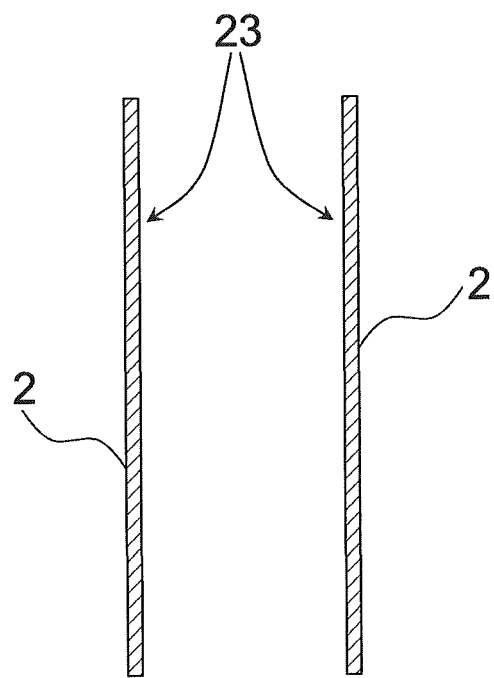
FIG. 1D is a schematic longitudinal cross-sectional view of the can body member shown in FIG. 1C.
Figure 1E:
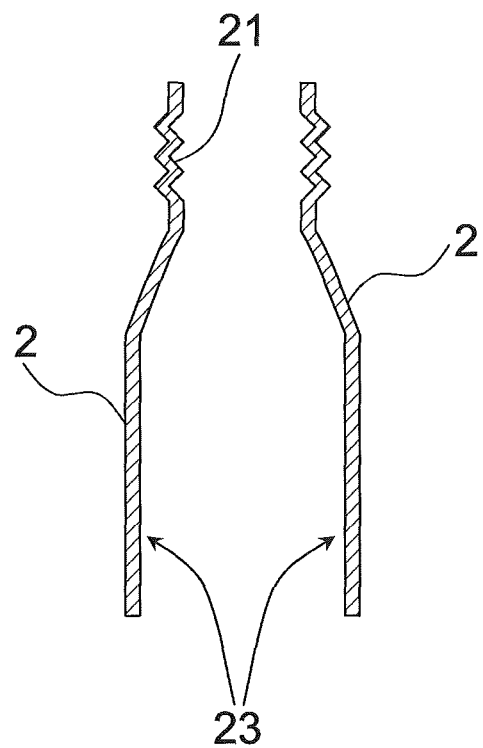
FIG. 1E is a schematic longitudinal cross-sectional view of the can body member after threading is performed.
Figure 1F:
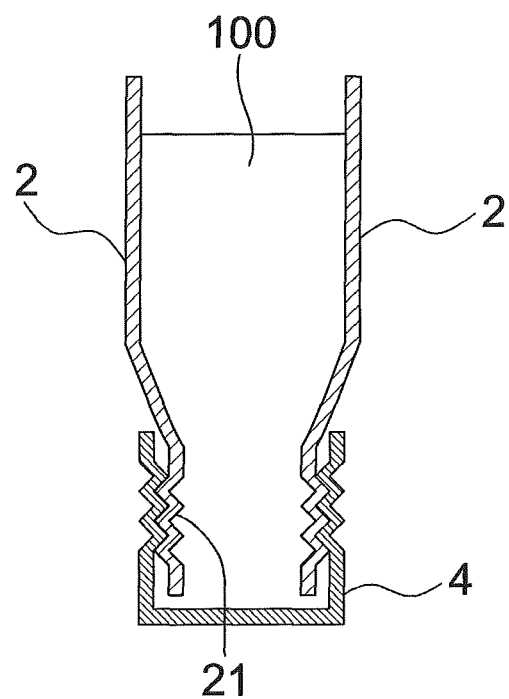
FIG. 1F is a schematic longitudinal cross-sectional view showing the can body member just after acidic liquid is filled.
Figure 1G:
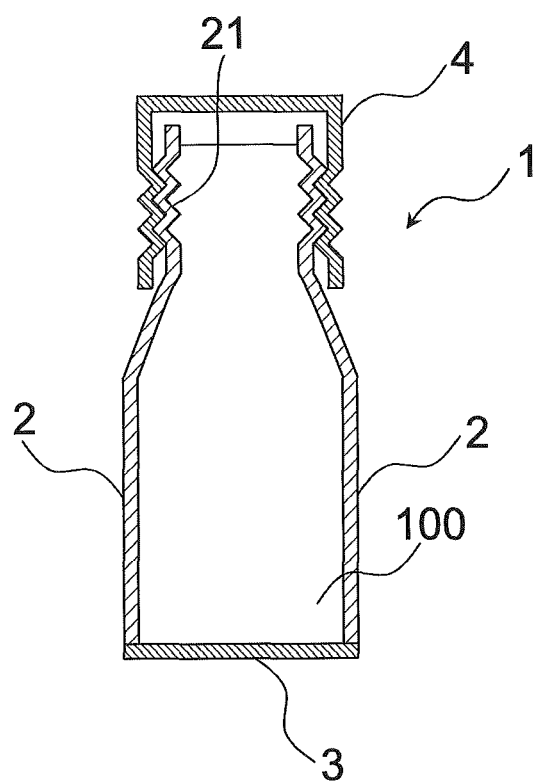
FIG. 1G is a schematic longitudinal cross-sectional view showing the resealable can into which the acidic liquid is filled.

Moreover, FIGS. 1B to 1G schematically show a method of manufacturing the can main body of the embodiment. As shown in FIG. 1B, the can body member 2 before the resealable can 1 is manufactured is a sheet shape, and includes welding portions 22 and a polyester film 23 when viewed from a direction perpendicular to the sheet surface. The welding portions 22 are formed along two sides which face each other in the sheet surface of the can body member 2, and an organic film such as a polyester film 23 is not formed on the surfaces of the welding portions 22. The sheet-shaped can body member 2 is formed in a cylindrical shape. For example, the welding portions 22 overlap with each other and are welded by electric resistance welding (lap welding), as shown in FIGS. 1C and 1D (a longitudinal cross-sectional view of FIG. 1C), such that the cylindrical can body member 2 can be obtained. Moreover, the threading is performed on the cylindrical can body member 2, and the screw portion 21 shown in FIG. 1E is formed. The cap 4 is mounted on the screw portion 21, as shown in FIG. 1F, and acidic liquid 100 (for example, acidic beverages) is filled from an opening portion of the end opposite to the end in which the screw portion 21 of the can body member 2 is formed. After the acidic liquid 100 is filled, as shown in FIG. 1G the end (end of the opening portion side) of the can body member 2 and the end of the can bottom member 3 are seamed to each other so as to close the opening portion, and the resealable can 1 into which the acidic liquid 100 is filled is manufactured. Moreover, the acidic liquid 100 is not particularly limited, and may be an acidic beverage such as orange juice.

In the resealable can 1 of the embodiment, for example, a plated steel sheet having a layer configuration shown in FIGS. 2A to 2F may be used in the can body member 2. FIGS. 2A to 2F schematically show an area A which is enclosed by a dashed line in FIG. 1A. Moreover, the layer configuration may be applied to at least the inner surface of the can main body 5 and may be also applied to both surfaces (inner surface and outer surface) of the can main body 5. As shown in FIGS. 2A to 2F, the can body member 2 includes a cylindrical steel sheet (a first steel sheet, a sheet to be plated) 26, Ni plating 25 which is formed on the inner circumference surface of the steel sheet 26, a polyester film 23 which is formed so as to be disposed on the outermost surface of the inner circumference of the can body member 2, and a chromate film 24 which is formed between the polyester film 23 and the steel sheet 26 (or, Ni plating 25). As described above, the amount of Ni plating 25 of the can body member 2 is 10 to 1000 mg/m$^2$, and the amount of chromate film 24 is 2 to 30 mg/m$^2$ expressed in terms of Cr metal. Moreover, in order to secure weldability, the amount of metal plating which is the closest to the outermost surface of the inner circumference of the can body member (in FIGS. 2A to 2F, Ni plating 25 or Sn plating 27 (that is, the Sn single metal plating 27A and alloyed Sn plating 27B)) is required to be 200 to 4000 mg/m$^2$.

Figure 2A:
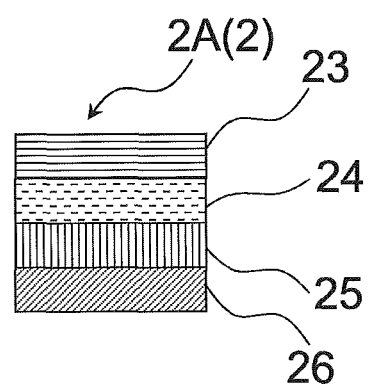
FIG. 2A is a cross-sectional view showing an example of a layer structure of the can body member of the resealable can according to the present embodiment.
Figure 2B:
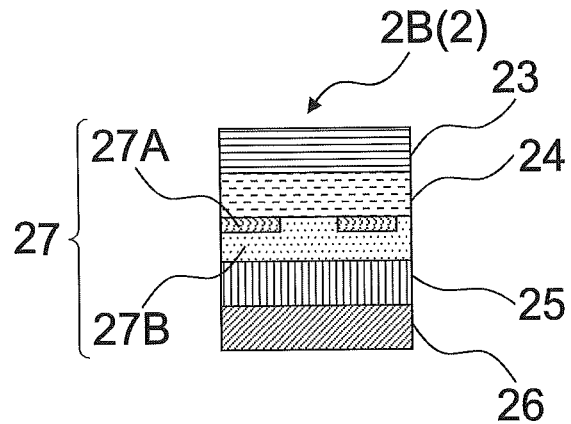
FIG. 2B is a cross-sectional view showing an example of the layer structure of the can body member of the resealable can according to the present embodiment.
Figure 2C:
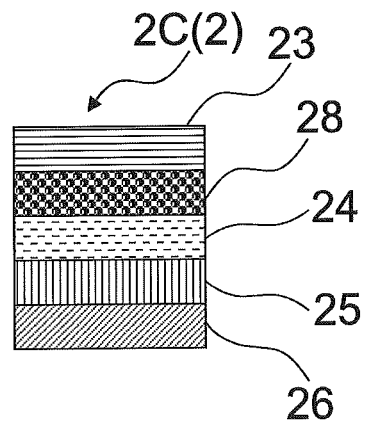
FIG. 2C is a cross-sectional view showing an example of the layer structure of the can body member of the resealable can according to the present embodiment.
Figure 2D:
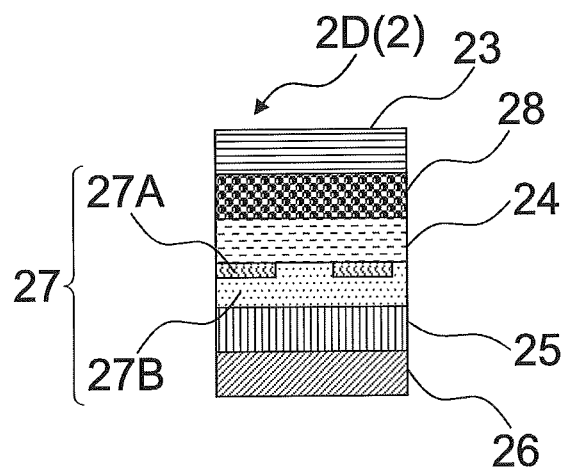
FIG. 2D is a cross-sectional view showing an example of the layer structure of the can body member of the resealable can according to the present embodiment.
Figure 2E:
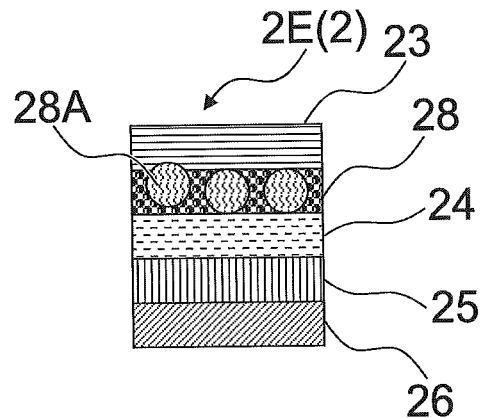
FIG. 2E is a cross-sectional view showing an example of the layer structure of the can body member of the resealable can according to the present embodiment.

In addition, in FIGS. 2A, 2C, and 2E, an example of the above-described Ni-plated steel sheet for the can body member is shown. In FIG. 2A, the can body member 2A includes the steel sheet 26, the Ni plating 25 which is formed on the surface of the steel sheet 26, the chromate film 24 which is formed on the surface of the Ni plating 25, and the polyester film 23 which is formed on the surface of the chromate film 24. In FIG. 2C, the can body member 2C includes the steel sheet 26, the Ni plating 25 which is formed on the surface of the steel sheet 26, the chromate film 24 which is formed on the surface of the Ni plating 25, an adhesive layer 28 which is formed on the surface of the chromate film 24, and a polyester film 23 which is formed on the surface of the adhesive layer 28. In the can body member 2E of FIG. 2E, the adhesive layer 28 contains Sn metal particles 28A in the layer configuration similar to that of FIG. 2C.

Figure 2F:
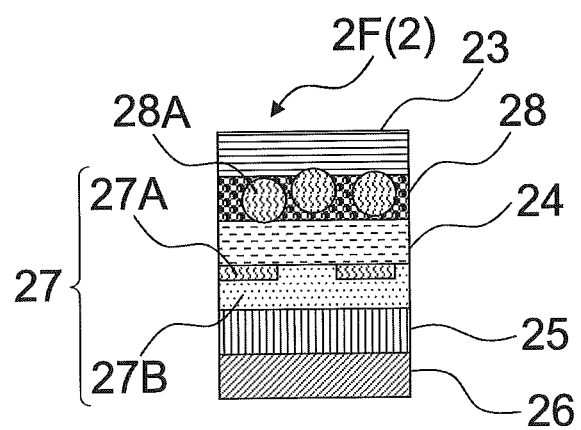
FIG. 2F is a cross-sectional view showing an example of the layer structure of the can body member of the resealable can according to the present embodiment.

Similarly, FIGS. 2B, 2D, and 2F show an example of the above-described Sn-plated steel for the can bottom member. In FIGS. 2B, 2D, and 2F, the Sn plating 27 which is formed on the surface of the Ni plating 25 is further provided. In FIG. 2B, the can body member 2B includes the steel sheet 26, the Ni plating 25 which is formed on the surface of the steel sheet 26, the Sn plating 27 which is formed on the surface of the Ni plating 25, the chromate film 24 which is formed on the surface of the Sn plating 27, and the polyester film 23 which is formed on the surface of the chromate film 24. In FIG. 2D, the can body member 2D includes the steel sheet 26, the Ni plating 25 which is formed on the surface of the steel sheet 26, the Sn plating 27 which is formed on the surface of the Ni plating 25, the chromate film 24 which is formed on the surface of the Sn plating 27, the adhesive layer 28 which is formed on the surface of the chromate film 24, and the polyester film 23 which is formed on the surface of the adhesive layer 28. In the can body member 2E of FIG. 2E, the adhesive layer 28 contains Sn metal particles 28A in the layer configuration similar to that of FIG. 2D. Moreover, in FIGS. 2B, 2D, and 2F, the Sn plating 27 is alloyed and includes the Sn single metal plating 27A and the alloyed Sn plating 27B.

Figure 5:
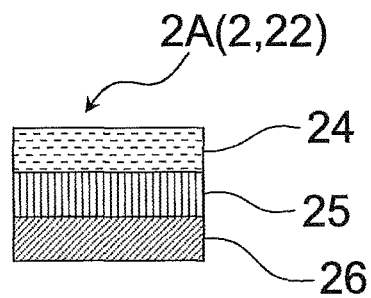
FIG. 5 is a cross-sectional view showing an example of a layer structure in the welding portion of the can body member of the resealable can according to the present embodiment.

Moreover, the polyester film 23 is not formed on the welding portion 22 of the can body member 2. Therefore, if the layer configuration of the non-welding portion of the can body member 2 is the layer configuration shown in FIG. 2A, the layer configuration of the welding portion 22 is the layer configuration shown in FIG. 5. Moreover, FIG. 5 schematically shows a longitudinal cross section of the welding portion 22 (area D) corresponding to the area A which is enclosed by the dashed line in FIG. 1A.

In the resealable can 1 of the embodiment, for example, a plated steel sheet having a layer configuration shown in FIGS. 3A to 3H can be used in the can bottom member 3. FIGS. 3A to 3H schematically show an area B which is enclosed by a dashed line in FIG. 1A. Moreover, this layer configuration may be applied to at least the inner surface of the can main body 5 and may be also applied to both surfaces (inner surface and outer surface) of the can main body 5. As shown in FIGS. 3A to 3H, the can bottom member 3 includes a steel sheet (second steel sheet, sheet to be plated) 36 and Sn plating 37 which is formed on the can body member 2 side of the steel sheet 36 (inner surface side of can main body 5). As described above, the Sn plating 27 of the can bottom member 3 includes Sn single metal plating of the amount of 2 to 20 mg/m$^2$.

Figure 3A:
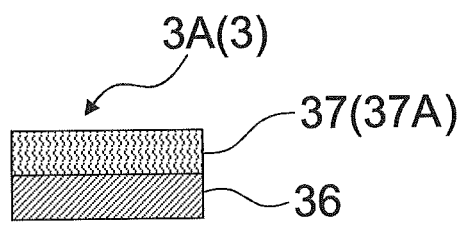
FIG. 3A is a cross-sectional view showing an example of a layer structure of a can bottom member of the resealable can according to the present embodiment.
Figure 3B:
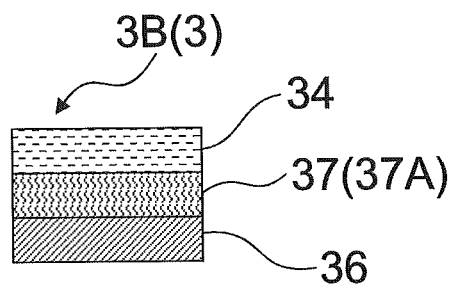
FIG. 3B is a cross-sectional view showing an example of the layer structure of the can bottom member of the resealable can according to the present embodiment.
Figure 3C:
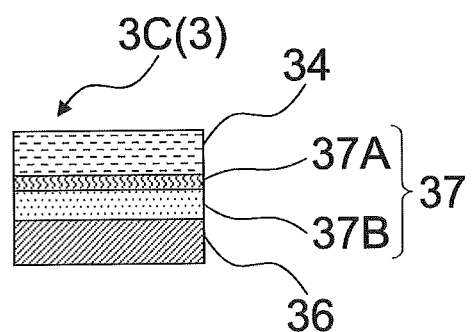
FIG. 3C is a cross-sectional view showing an example of the layer structure of the can bottom member of the resealable can according to the present embodiment.
Figure 3D:
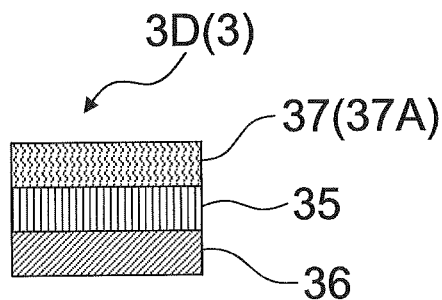
FIG. 3D is a cross-sectional view showing an example of the layer structure of the can bottom member of the resealable can according to the present embodiment.
Figure 3E:
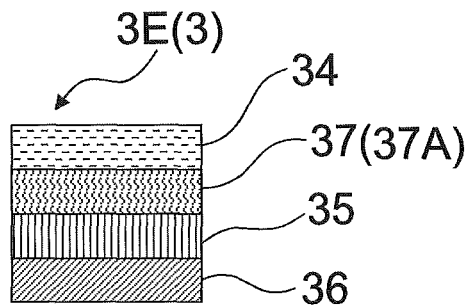
FIG. 3E is a cross-sectional view showing an example of the layer structure of the can bottom member of the resealable can according to the present embodiment.
Figure 3F:
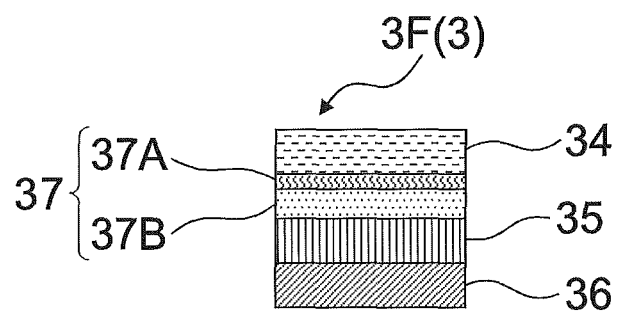
FIG. 3F is a cross-sectional view showing an example of the layer structure of the can bottom member of the resealable can according to the present embodiment.
Figure 3G:
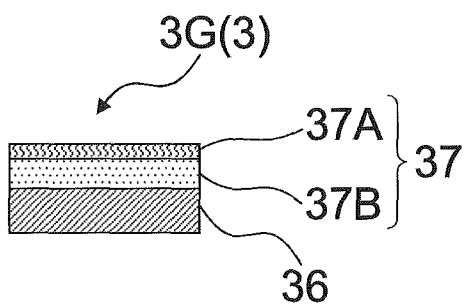
FIG. 3G is a cross-sectional view showing an example of the layer structure of the can bottom member of the resealable can according to the present embodiment.
Figure 3H:
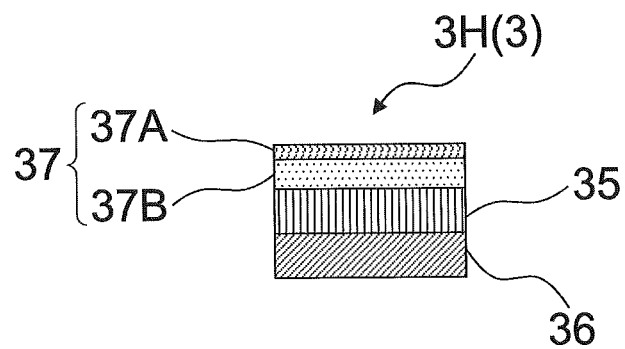
FIG. 3H is a cross-sectional view showing an example of the layer structure of the can bottom member of the resealable can according to the present embodiment.

Moreover, FIGS. 3A to 3H show an example of the above-described Sn-plated steel sheet for the can bottom member. In FIG. 3A, the can bottom member 3A includes the steel sheet 36 and the Sn plating 37 which is formed on the surface of the steel sheet 36. In FIG. 3B, the can bottom member 3B includes the steel sheet 36, the Sn plating 37 which is formed on the surface of the steel sheet 36, and a chromate film 34 which is formed on the surface of the Sn plating 37. Similarly, in FIG. 3C, the can bottom member 3C includes the steel sheet 36, the Sn plating 37 which is formed on the surface of the steel sheet 36, and the chromate film 34 which is formed on the surface of the Sn plating 37. In FIG. 3D, the can bottom member 3D includes the steel sheet 36, Ni plating 35 which is formed on the surface of the steel sheet 36, and the Sn plating 37 which is formed on the surface of the Ni plating 35. In FIG. 3E, the can bottom member 3E includes the steel sheet 36, the Ni plating 35 which is formed on the surface of the steel sheet 36, the Sn plating 37 which is formed on the surface of the Ni plating 35, and the chromate film 34 which is formed on the surface of the Sn plating 37. Similarly, in FIG. 3F, the can bottom member 3F includes the steel sheet 36, the Ni plating 35 which is formed on the surface of the steel sheet 36, the Sn plating 37 which is formed on the surface of the Ni plating 35, and the chromate film 34 which is formed on the surface of the Sn plating 37. In FIG. 3G the can bottom member 3G includes the steel sheet 36 and the Sn plating 37 which is formed on the surface of the steel sheet 36. In FIG. 3H, the can bottom member 3H includes the steel sheet 36, the Ni plating 35 which is formed on the surface of the steel sheet 36, and the Sn plating 37 which is formed on the surface of the Ni plating 35.

Here, in FIGS. 3A, 3D, 3G and 3H, the outermost surface on the can body member 2 side of the can bottom member 3 is the Sn plating 37, and in FIGS. 3B, 3C, 3E, and 3F, the outermost surface on the can body member 2 side of the can bottom member 3 is chromate film 34. In addition, in FIGS. 3D to 3F, and 3H, the can bottom member 3 includes the Ni plating 35 which is formed on the surface on the can body member 2 side of the can bottom member 3 on or above the steel sheet 36. Moreover, in FIGS. 3A, 3B, 3D, and 3E, the Sn plating 37 includes only the Sn single metal plating 37A. In addition, in FIGS. 3C, 3F, 3G and 3H, the Sn plating 37 includes both the Sn single metal plating 37A and alloyed Sn plating.

Figure 4A:
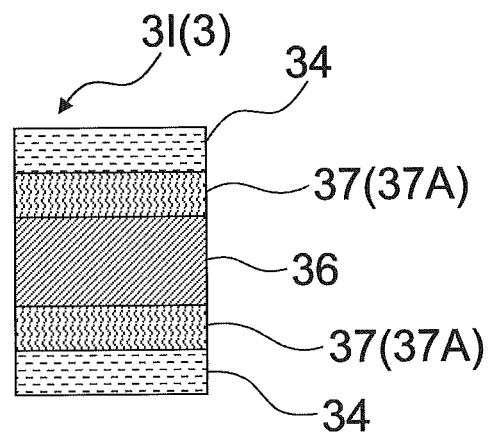
FIG. 4A is a cross-sectional view showing an example of the layer structure of the can bottom member of the resealable can according to the present embodiment.
Figure 4B:
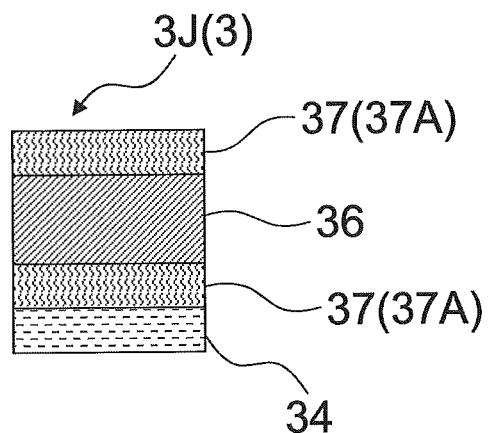
FIG. 4B is a cross-sectional view showing an example of the layer structure of the can bottom member of the resealable can according to the present embodiment.

Moreover, as described above, the chromate film 34 is formed so as to improve the coatability of the outer surface of the can main body 5. However, in order to easily perform the chromate treatment, for example, as shown in a can bottom member 3I of FIG. 4A, the chromate film 34 may be formed on both surfaces of the can bottom member 3. Moreover, in order to effectively exert the sacrificial protection effect of the Sn plating 37 as possible, for example, as shown in a can bottom member 3J of FIG. 4B, the chromate film 34 may be only formed on the outer surface of the can main body 5. In addition, for example, FIGS. 4A and 4B schematically show an area C which is enclosed by a dashed line in FIG. 1A.

In the embodiment, the can body 5 can be manufactured by variously combining the above-described can body member 2 and the can bottom member 3. Moreover, by appropriately controlling or selecting the processing method when seaming the can body member 2 and the can bottom member 3, the resistance between the can body member 2 and the can bottom member 3 may be controlled as described above. For example, in the resistance of this case, the resistance between the metal surface (various platings or sheets to be plated) of the can body member 2 and the metal surface (various platings or sheets to be plated) of the can bottom member 3 may be measured while the seamed position is interposed.

For example, in the embodiment, as described below, by controlling an amount of each layer (each plating and film) and order of the lamination, the can main body suitable as a container for filling acidic liquid can be provided.

(A) A three-piece resealable can for acidic liquid is provided in which a steel sheet without a coating and film in which Sn plating is applied to one surface at 2 to 15 $g/m^2$ is used in the can bottom portion of the can main body subjected to the threading, and a steel sheet in which Ni plating is applied to one surface at 200 to 1000 $mg/m^2$, subsequently, a chromate film is applied at 2 to 10 $mg/m^2$ expressed in terms of Cr metal, and a PET film is laminated is used in the can body portion.

(B) A three-piece resealable can for acidic liquid is provided in which a steel sheet without a coating and film in which Sn plating is applied to one surface at 2 to 15 $g/m^2$, and subsequently, a chromate film is applied at 2 to 10 $mg/m^2$ expressed in terms of Cr metal is used in the can bottom portion of the can main body subjected to the threading, and a steel sheet in which Ni plating is applied to one surface at 200 to 1000 $mg/m^2$, a chromate film is applied at 2 to 10 $mg/m^2$ expressed in terms of Cr metal, and a PET film is laminated is used in the can body portion.

(C) A three-piece resealable can for acidic liquid is provided in which a steel sheet without a coating and film in which Sn plating is applied to one surface at 2 to 15 $g/m^2$ is used in the can bottom portion of the can main body subjected to the threading, and a steel sheet in which Ni plating is applied to one surface at 10 to 200 $mg/m^2$, subsequently, Sn plating is applied at 0.2 to 2 $g/m^2$, Sn is alloyed by performing reflow, thereafter, a chromate film is applied at 10 to 30 $mg/m^2$ expressed in terms of Cr metal, and a PET film is laminated is used in the can body portion.

(D) A three-piece resealable can for acidic liquid is provided in which a steel sheet without a coating and film in which Sn plating is applied to one surface at 2 to 15 $g/m^2$, subsequently, a chromate film is applied at 2 to 10 $mg/m^2$ expressed in terms of Cr metal is used in the can bottom portion of the can main body subjected to the threading, and a steel sheet in which Ni plating is applied to one surface at 10 to 200 $mg/m^2$, subsequently, Sn plating is applied at 0.2 to 2 $g/m^2$, Sn is alloyed by performing reflow, thereafter, a chromate film is applied at 10 to 30 $mg/m^2$ expressed in terms of Cr metal, and a PET film is laminated is used in the can body portion.

(E) A three-piece resealable can for acidic liquid is provided in which the reflow is performed after the Sn plating and Sn of 0.2 $g/m^2$ to 1.5 $g/m^2$ is alloyed in the Sn-plated steel sheet which is used in the can bottom portion according to any one of (A) to (D).

(F) A three-piece resealable can for acidic liquid is provided in which the Ni plating is applied to one surface at 10 to 200 $mg/m^2$ before the Sn plating in the Sn-plated steel sheet which is used in the can bottom portion according to any one of (A) to (E).

Moreover, for example, in the embodiment, as described below, a more suitable can main body can be provided by controlling the resistance between the can cover and the can body.

(G) A three-piece resealable can for acidic liquid is provided in which a resistance between a can body and a bottom cover is 1Ω or less in a can main body including the can body which is formed by performing threading to a Ni-plated steel sheet in which Ni plating is formed at 200 to 1000 $mg/m^2$ per one surface, a chromate film is formed at 2 to 10 $mg/m^2$ expressed in terms of Cr metal, and a polyester film is laminated on a surface corresponding to at least the inner surface of the can through an adhesive layer, and the bottom cover which is formed by an Sn-plated steel sheet in which Sn plating is formed at 5 to 20 $g/m^2$ per one surface, subsequently, a chromate film is formed at 2 to 10 $mg/m^2$ expressed in terms of Cr metal, and an organic coating does not formed in a portion which contacts at least the contents (liquid) in the inner surface of the can.

(H) A three-piece resealable can for acidic liquid is provided in which the bottom cover formed by the Sn-plated steel sheet is configured by forming Sn plating of 8 to 16 $g/m^2$ per one surface, subsequently, by forming the chromate film of 2 to 10 $mg/m^2$ expressed in terms of Cr metal, in the three-piece resealable can according to (G).

(I) A three-piece resealable can for acidic liquid is provided in which the resistance between the can body and the bottom cover is 0.1Ω or less, in the three-piece resealable can according to (H).

Moreover, for example, in the embodiment, as described below, a more suitable can main body can be provided by including Sn metal particles in the adhesive layer. That is, (J) A three-piece resealable can for acidic liquid is provided in which, in a can main body including a can body portion configured by performing threading with respect to a steel sheet which is configured by forming Ni plating of 200 to 1000 mg/m$^2$ per one surface, subsequently, by forming a chromate film of 2 to 10 mg/m$^2$ expressed in terms of Cr metal, and by laminating a polyester film on at least one surface corresponding to the inner surface of the can through the adhesive layer, Sn metal particles having the mean particle diameter of 2 to 7 μm are contained in the adhesive layer at 100 to 3600 mg/m$^2$ of the steel sheet (as an amount per surface area).

(K) A three-piece resealable can for acidic liquid is provided in which the mean particle diameter of the Sn metal particles is 3 to 6 μm, in the three-piece resealable can according to (J).

(L) A three-piece resealable can for acidic liquid is provided in which the Sn metal particles are contained at 300 to 2000 mg/m$^2$ of the steel sheet (as an amount per surface area), in the three-piece resealable can according to (J) or (K).

EXAMPLES

Hereinafter, the present invention will be described in detail according to examples. However, the present invention is not limited to the examples as long as the solution thereof is not changed.

First, manufacturing methods of the Ni-plated steel sheet (mainly used for can body member) and the Sn-plated steel sheet (used for can body member and can bottom member), which are used in the following examples, are described.

(Manufacturing Method 1) Ni plating was applied to both surfaces of a sheet to be plated (steel sheet) which was subjected to annealing and skin pass after cold rolling and had a thickness of 0.19 mm, by applying a current of a current density of 1 A/dm$^2$ in a solution of 45° C. and pH 4 including Ni ions of 40 g/L using Ni sulfate and boric acid. Subsequently, by performing chromate treatment with respect to both surfaces of the steel sheet through cathode electrolysis at a current density of 5 A/dm$^2$ in a solution of 100 g/L chromic acid and 1 g/L sulfuric acid at 45° C., the Ni-plated steel sheet was manufactured. The Ni-plated steel sheet was cut down to a length of 110 mm and a width of 170 mm, a PET film which was biaxially stretched and had a thickness of 15 μm was laminated on both surfaces of the sheet except for the vicinity of the vertical edges which became the portions to be welded, and the Ni-plated steel sheet for the can body member was manufactured.

(Manufacturing Method 2) Ni plating was applied to both surfaces of a sheet to be plated (steel sheet) which was subjected to annealing and skin pass after cold rolling and had a thickness of 0.19 mm, by applying a current of a current density of 10 A/dm$^2$ in a solution of 45° C. and pH 2.5 including Ni ions of 40 g/L and Fe ions of 20 g/L using Ni sulfate, Fe sulfate, and boric acid. Subsequently, by preparing an Sn plating solution of pH 1.1 including Sn ions of 20 g/L using Sn sulfate and sulfuric acid, applying Sn plating to both surfaces of the steel sheet at 45° C. and 2 A/dm$^2$, and performing reflow and chromate treatment, the Sn-plated steel sheet was manufactured. In the reflow, the steel sheet was cooled by 60° C. water just after being heated up to about 245° C. through an electric heating method. In the chromate treatment, the cathode electrolysis was performed at a current density of 20 A/dm$^2$ in a solution of 100 g/L chromic acid and 1 g/L sulfuric acid. The Sn-plated steel sheet was cut down to a length of 110 mm and a width of 170 mm, a PET film which was biaxially stretched and had a thickness of 15 μm was laminated on both surfaces of the sheet except for the vicinity of the vertical edges which became the portions to be welded, and the Sn-plated steel sheet for the can body member was manufactured.

(Manufacturing Method 3) Ni plating was applied to both surfaces of a sheet to be plated (steel sheet) which was subjected to annealing and skin pass after cold rolling and had a thickness of 0.19 mm, by applying a current of a current density of 1 A/dm$^2$ in a solution of 45° C. and pH 4 including Ni ions of 40 g/L using Ni sulfate. Subsequently, by preparing an Sn plating solution of pH 1.1 including Sn ions of 20 g/L using Sn sulfate and sulfuric acid, applying Sn plating to both surfaces of the steel sheet at 45° C. and 2 A/dm$^2$, and performing reflow and chromate treatment, the Sn-plated steel sheet was manufactured. In the reflow, the steel sheet was cooled by 60° C. water just after being heated up to about 245° C. through an electric heating method. In the chromate treatment, the cathode electrolysis was performed at a current density of 20 A/dm$^2$ in a solution of 100 g/L chromic acid and 1 g/L sulfuric acid. The Sn-plated steel sheet was cut down to a length of 110 mm and a width of 170 mm, a PET film which was biaxially stretched and had a thickness of 15 μm was laminated on both surfaces of the sheet except for the vicinity of the vertical edges which became the portions to be welded, and the Sn-plated steel sheet for the can body member was manufactured.

In addition, the Sn-plated steel sheet for the can bottom member was manufactured by the following methods.

(Manufacturing Method 4) Sn plating was applied to both surfaces of a sheet to be plated (steel sheet) which was subjected to annealing and skin pass after cold rolling and had a thickness of 0.19 mm, at 45° C. and 2 A/dm$^2$ in an Sn plating solution of pH 1.1 including Sn ions of 20 g/L prepared using Sn sulfate and sulfuric acid, reflow and chromate treatment were performed as necessary, and the Sn-plated steel sheet was manufactured. In the reflow, the steel sheet was cooled by 60° C. water just after being heated up to about 245° C. through an electric heating method. In the chromate treatment, the cathode electrolysis was performed at a current density of 3 A/dm$^2$ in a solution of 40 g/L sodium dichromate at pH 4.

(Manufacturing Method 5) After the Ni plating was applied to both surfaces of a sheet to be plated (steel sheet) which was subjected to annealing and skin pass after cold rolling and had a thickness of 0.19 mm using the same conditions as in the Manufacturing Method 2, Sn plating was applied at 45° C. and 2 A/dm$^2$ in an Sn plating solution of pH 1.1 including Sn ions of 20 g/L prepared by using Sn sulfate and sulfuric acid, reflow and chromate treatment were performed as necessary, and the Sn-plated steel sheet was manufactured. In the reflow, the steel sheet was cooled by 60° C. water just after being heated up to about 245° C. through an electric heating method. In the chromate treatment, the cathode electrolysis was performed at a current density of 3 A/dm$^2$ in a solution of 40 g/L sodium dichromate at pH 4.

(Manufacturing Method 6) After Ni plating was applied to both surfaces of a sheet to be plated (steel sheet) which was subjected to annealing and skin pass after cold rolling and had a thickness of 0.19 mm using the same conditions as in the Manufacturing Method 3, Sn plating was applied at 45° C. and 2 A/dm$^2$ in an Sn plating solution of pH 1.1 including Sn ions of 20 g/L prepared by using Sn sulfate and sulfuric acid, reflow and chromate treatment were performed as necessary, and the Sn-plated steel sheet was manufactured. In the reflow, the steel sheet was cooled by 60° C. water just after being heated up to about 245° C. through an electric heating method. In the chromate treatment, the cathode electrolysis was performed at a current density of 3 A/dm$^2$ in a solution of 40 g/L sodium dichromate at pH 4.

The steel sheets manufactured by the above-described Manufacturing Methods 1 to 6 were applied to the can body member and the can bottom member according to combinations shown in Table 1. In addition, by adjusting conditions such as treatment time in each of the Manufacturing Methods 1 to 6, the amount of each layer of Nos. 1 to 25 (the amount of Ni plating, the amount of Sn single metal plating, the amount of alloyed Sn plating, and the amount of chromate film) were adjusted. Among the layers, with respect to the amount of Ni plating and the amount of chromate film (moreover, the amount expressed in terms of Cr metal), each of the amount of Ni metal and the amount of Cr metal was estimated through an ICP (inductively coupled plasma) spectroscopic analysis. In addition, with respect to the amount of Sn single metal plating and the amount of alloyed Sn plating, the amount of Sn was estimated through a SEM-EDX (scanning electron microscope/energy dispersive X-ray spectroscopy). Moreover, the alloyed Sn plating was determined to be an area in which Fe and Ni were detected in the Sn plating, and Sn single metal plating was determined to be an area in which Fe and Ni were not detected in the Sn plating.

Hereinafter, estimation methods will be described. Moreover, with respect to Nos. 1 to 25 in Table 1, each of the following estimation items (1) to (4) was estimated.

<Estimation Methods>

(1) Weldability

Various PET resin film laminated-steel sheets (steel sheets for can body member) which were manufactured were welded at a welding speed of 550 cpm by using a welder of Soudronic AG. In addition, in the welding, the overlapped portion of the portions to be welded was set to 0.4 mm, and the pressing force was set to 45 daN. The weldability was generally determined from a size of an adequate current range and continuity of a weld nugget and was estimated to be in one of four grades (A: very good, B: good, C: bad, D: welding impossible). Here, the adequate current range is a current range which includes a minimum current value in which sufficient welding strength is obtained and a maximum current value in which welding defects such as expulsion and a weld spatter begin to be significant when the welding current is changed and the welding is performed.

(2) Film Adhesiveness of Screw Formed Portion

Threading was performed on the can body, which pinches the upper portion of the can body after the welding between two dies while rotating two cylindrical dies including grooves having 1 mm of a pitch at 150 rpm and forms a thread and groove having 1 mm of a height and 1 mm of a pitch. Thereafter, retorting of 125° C. and 30 minutes was performed, and a separation resistance of the film of the screw formed portion was estimated to be in one of four grades (A: separation (peel-off) was not present at all after threading and retorting, B: separation was not present after the forming and slight separation which was not a problem in practical use was present after the retorting, C: minor peeling was present after the forming, and D: separation was present over most thereof after the forming).

(3) Corrosion Resistance

The can body portion (screw portion) subjected to the threading was covered with a cap made of aluminum, commercially available 100% orange juice (acidic beverage) was filled, the can cover was seamed to the can body, and the can was manufactured. After the can was stored at 30° C. for six months, the contents were extracted, the amount of dissolved iron was measured, and corrosion of the inner surface of the can was observed. The observation of the corrosion was performed by visually observing mainly the screw portion, and the corrosion resistance was estimated to be in one of four grades (A: corrosion was not observed at all in screw portion and flat sheet portion, B: corrosion was not observed at all in flat sheet portion while slight corrosion which was not a problem in practical use was observed in screw portion, C: slight corrosion was observed in screw portion and flat sheet portion, and D: severe corrosion was observed in the screw portion, and corrosion was also observed in flat sheet portion). The appearance (appearance of can bottom after test) of the alloyed layer exposed on the can bottom (can cover) was also observed.

(4) Adhesiveness of Coating Material of Can Bottom Member (Adhesiveness of Coating Material of Outer Surface of Can Bottom)

Epoxy phenol resin was coated on the Sn-plated steel sheet for the can bottom member, baking of 200° C. and 30 minutes was performed, thereafter, cover forming was performed so as to be used as the can bottom member. A tape peeling test was performed to a curled portion or a countersink portion formed by the cover forming, and the peeling resistance was estimated.

In addition, grid-like marking-off having depths reaching the matrix (steel sheet) was applied to the Sn-plate steel sheet at intervals of 1 mm after the epoxy phenol resin was baked, the tape peeling test was performed on the marking-off portions, and the peeling resistance was estimated.

The results of the tape peeling test were generally estimated, the adhesiveness of the coating material was estimated to be in one of four grades (A: peeling was not present at all, B: slight peeling which was not a problem in practical use was present, C: slight peeling was present, D: peeling was present over most thereof).

As shown in Table 1, in Nos. 1 to 19 which satisfied the conditions according to the present invention, the weldability, the film adhesiveness, and the corrosion resistance were improved. On the other hand, in Nos. 20 to 25 which did not satisfy the conditions according to the present invention, any of the weldability, the film adhesiveness, and the corrosion resistance was deteriorated. Moreover, in No. 25 of Table 1, the Ni-plated steel sheet on which the same PET film as the can body member was laminated was also used with respect to the can bottom member. In No. 25, the formed portion such as the screw portion or the flat sheet portion was corroded in the form of spots, and the amount of dissolved iron also increased. In addition, in cross-sectional observation of the corroded areas, perforation corrosion proceeded. Particularly, in severely corroded areas, it was confirmed that the perforation corrosion proceeded up to about ⅘ of the sheet thickness. On the other hand, when the Sn-plated steel sheet on which the Sn plating of sufficient amount was applied was used in the can bottom (can bottom member), the corrosion was not observed at all. Even in the areas where the corrosion was observed, the amount of the perforation corrosion was slight and was about 1/10 of the sheet thickness at most. The adhesiveness of the coating material of Nos. 2, 4, 6, 8, 10, 12, 14, and 16 to 19 in which the chromate film was applied to the can bottom member was higher compared to the adhesiveness of the coating material of Nos. 1, 3, 5, 7, 9, 11, 13, and 15 in which the chromate film was not applied to the can bottom member. Thereby, when the coating material was coated on the can bottom, it was confirmed that the can bottom member having the chromate film on the surface in which the coating material was coated on the can bottom member (that is, surface which did not contact acidic liquid, outer surface of the can main body) could be appropriately used.

As shown in the above-described examples, it was obvious that the three-piece resealable can according to the present invention had improved weldability, film adhesiveness, and corrosion resistance and could store acidic liquid (acidic beverages) with high quality.

TABLE 1

| | Can body member | | | | | Can bottom member | | | | |
|---|---|---|---|---|---|---|---|---|---|---|
| No. | Manufacturing Method | Amount of Ni plating (mg/m²) | Amount of Sn single metal plating (g/m²) | Amount of alloyed Sn plating*¹ (g/m²) | Amount of chromate film*² (mg/m²) | Manufacturing Method | Amount of Ni plating (mg/m²) | Amount of Sn single metal plating (g/m²) | Amount of alloyed Sn plating*¹ (g/m²) | Amount of chromate film*² (mg/m²) |
| 1 | 1 | 240 | — | — | 3 | 4 | — | 14 | — | — |
| 2 | 1 | 540 | — | — | 7 | 4 | — | 3 | — | 4 |
| 3 | 1 | 960 | — | — | 8 | 4 | — | 9 | 1.2 | — |
| 4 | 1 | 240 | — | — | 4 | 4 | — | 4 | 0.6 | 6 |
| 5 | 1 | 540 | — | — | 9 | 5 | 60 | 3 | — | — |
| 6 | 1 | 960 | — | — | 2 | 5 | 25 | 9 | — | 2 |
| 7 | 1 | 810 | — | — | 5 | 6 | 180 | 9 | 1.2 | — |
| 8 | 1 | 450 | — | — | 6 | 6 | 12 | 4 | 0.6 | 8 |
| 9 | 2 | 80 | 1 | 0.8 | 18 | 4 | — | 14 | — | — |
| 10 | 2 | 180 | 0.4 | 0.25 | 28 | 4 | — | 3 | — | 4 |
| 11 | 2 | 15 | 0.25 | 0.2 | 12 | 4 | — | 9 | 1.2 | — |
| 12 | 2 | 80 | 1 | 0.8 | 18 | 4 | — | 4 | 0.6 | 6 |
| 13 | 3 | 180 | 0.4 | 0.25 | 28 | 5 | 60 | 3 | — | — |
| 14 | 3 | 45 | 0.8 | 0.2 | 11 | 5 | 25 | 9 | — | 2 |
| 15 | 3 | 94 | 0.5 | 0.8 | 19 | 6 | 180 | 9 | 1.2 | — |
| 16 | 3 | 30 | 1.8 | 1.4 | 20 | 6 | 12 | 4 | 0.6 | 8 |
| 17 | 1 | 350 | — | — | 4 | 4 | — | 13 | 1.2 | 3 |
| 18 | 1 | 400 | — | — | 4 | 5 | 110 | 4 | 0.7 | 6 |
| 19 | 1 | 700 | — | — | 6 | 6 | 40 | 2 | 0.3 | 9 |
| 20 | 1 | <u>180</u> | — | 0.3 | 12 | 4 | — | 7 | 0.3 | 10 |
| 21 | 1 | 750 | — | 0.3 | <u>1.7</u> | 4 | — | 3 | 0.3 | 6 |
| 22 | 2 | 35 | <u>0.15</u> | 0.12 | <u>33</u> | 4 | — | 3 | 0.5 | 8 |
| 23 | 2 | 15 | 4 | 1.8 | 4 | 5 | 15 | <u>1.8</u> | 0.2 | 4 |
| 24 | 3 | <u>8</u> | 2.5 | 0.3 | 3 | 6 | 58 | <u>1.4</u> | 0.9 | 3 |
| 25 | 1 | 400 | — | — | 3 | 1 | 400 | — | — | 3 |

| | Estimation Results | | | | | |
|---|---|---|---|---|---|---|
| No. | Weldability | Film adhesiveness in screw formed portion | Amount of dissolved iron (ppm) | Corrosion resistance | Adhesiveness of coating material on can bottom member | Appearance of can bottom member after test |
| 1 | A | A | 5.2 | B | C | Black |
| 2 | A | A | 6.3 | B | A | Black |
| 3 | A | A | 1.8 | A | C | Dark gray |
| 4 | A | A | 2.1 | A | A | Dark gray |
| 5 | A | A | 3.4 | A | C | Black |
| 6 | A | A | 4.3 | A | A | Black |
| 7 | A | A | 1 | A | C | Silver white |
| 8 | A | A | 0.8 | A | A | Silver white |
| 9 | A | A | 5.3 | B | C | Black |
| 10 | A | A | 6.2 | B | A | Black |
| 11 | A | A | 1.9 | A | C | Dark gray |
| 12 | A | A | 2.2 | A | A | Dark gray |
| 13 | A | A | 3.3 | A | C | Black |
| 14 | A | A | 4.2 | A | A | Black |
| 15 | A | A | 1.1 | A | C | Silver white |
| 16 | A | A | 0.9 | A | A | Silver white |
| 17 | A | A | 0.8 | A | A | Silver white |
| 18 | A | A | 0.8 | A | A | Silver white |
| 19 | A | A | 0.7 | A | A | Silver white |
| 20 | D | A | 0.5 | A | A | Black |
| 21 | A | D | 1 | A | A | Black |
| 22 | D | A | 1.2 | A | A | Black |
| 23 | A | D | 34.2 | D | A | Silver white |
| 24 | A | D | 45.8 | D | A | Silver white |
| 25 | A | A | 75.2 | D | — | Black |

* Underlines in this table indicate that the underlined cells do not satisfy conditions according to the present invention.
*¹Amount of alloyed Sn plating is equivalent to the amount in metal Sn.
*²Amount of chromate film is equivalent to the amount in chromium metal.

In addition, in order to further improve the corrosion resistance of the can body member, the can main body was manufactured in which the resistance between the can body member and the can bottom member was changed. For example, in order to decrease the resistance between the can body member and the can bottom member, in Nos. 25 to 43 below, structure factors such as a method of seaming the can bottom member to the can body member or material factors such as the amount of each layer of the can body member and the can bottom member were changed.

The Ni-plated steel sheet used in the can body member of No. 25 was manufactured according to the following method (corresponding to the Manufacturing Method 1). Ni plating was applied to both surfaces of a sheet to be plated (steel sheet) which was subjected to annealing and skin pass after cold rolling and had a thickness of 0.19 mm, by applying a current of a current density of 1 A/dm$^2$ in a solution of 45° C. and pH 4 including Ni ions of 40 g/L using Ni sulfate and boric acid. Subsequently, by performing chromate treatment with respect to both surfaces of the steel sheet through cathode electrolysis at a current density of 5 A/dm$^2$ in a solution of 100 g/L chromic acid and 1 g/L sulfuric acid at 45° C., the Ni-plated steel sheet was manufactured. The amount of Ni adhered to the steel sheet (the amount of Ni plating) was 500 mg/m$^2$, and the amount of chromate film was 5 mg/m$^2$ expressed in terms of chromium metal.

The Sn-plated steel sheet used in the can bottom member (bottom cover) of No. 25 was manufactured according to the following method (corresponding to the Manufacturing Method 4). Sn plating was applied to both surfaces of a sheet to be plated (steel sheet) which was subjected to annealing and skin pass after cold rolling and had a thickness of 0.19 mm, at 45° C. and 2 A/dm$^2$ in an Sn plating solution of pH 1.1 including Sn ions of 20 g/L prepared by using Sn sulfate and sulfuric acid, reflow and chromate treatment were performed as necessary, and the Sn-plated steel was manufactured. In the reflow, the steel sheet was cooled by 60° C. water just after being heated up to about 245° C. through an electric heating method. In the chromate treatment, the cathode electrolysis was performed at a current density of 3 A/dm$^2$ in a solution of 40 g/L sodium dichromate at pH 4. The amount of Si adhered to the steel sheet (the amount of Sn metal plating) was 11.2 g/m$^2$, and the amount of chromate film was 5 mg/m$^2$ expressed in terms of chromium metal.

The Ni-plated steel sheet was cut down to a width of 170 mm. Next, the cut Ni-plated steel sheet was heated to 180° C., a PET film (polyester resin film) of the thickness of 12 μm having an adhesive layer was bonded by thermal compression to both surfaces of the sheet except for the vicinity of the vertical edges which became the portions to be welded, and the Ni-plated steel sheet in which the PET resin film was laminated was manufactured. Moreover, the Ni-plated steel sheet was cut down to a length of 110 mm (the size in a direction perpendicular to the width direction). At this time, the Ni-plated steel sheet was cut so that the direction of the burr on the side (side which becomes can end, sheet edge) on which the Ni-plated steel sheet and the bottom cover are seamed became the outer surface direction of the can.

As the steel sheet material of No. 26 (can body member and can bottom member), a Ni-plated steel sheet which was manufactured similarly to No. 25 except for the processing method (processing method of end surface) of the can end on one side, and the same Sn-plated steel sheet as No. 25 were used. That is, in the processing method of the end surface of the can body member, the PET resin film and the adhesive layer, which were formed on the outer surface of Ni-plated steel sheet, were mechanically removed using a grinder in an area having a width of 1 mm from the sheet edge on the side (side which becomes can end) on which the bottom cover and the Ni-plated steel sheet in which the PET resin film having a length of 110 mm and a width of 170 mm was laminated were seamed.

As the steel sheet material of No. 27 (can body member and can bottom member), a Ni-plated steel sheet and an Sn-plated steel sheet, which were manufactured similarly to No. 25 except for the processing method (processing method of end surface) of the can end on one side, were used. That is, in the processing method of the end surface of the can body member, the PET resin film and the adhesive layer, which were formed on the outer surface of the Ni-plated steel sheet, were evaporated and removed using a laser beam in an area having a width of 0.5 mm from the sheet edge on the side (side which becomes can end) on which the bottom cover and the Ni-plated steel sheet in which the PET resin film having a length of 110 mm and a width of 170 mm was laminated were seamed.

As the steel sheet material of No. 28 (can body member and can bottom member), a Ni-plated steel sheet (the same Ni-plate steel sheet as that of No. 27) which was manufactured similarly to No. 25 except for the processing method (processing method of end surface) of the can end on one side, and an Sn-plated steel sheet which was manufactured similarly to No. 25 except for the amount of Sn plating were used. That is, in the can bottom member, the amount of Sn plating (the amount of Sn metal plating) was 5.6 g/m$^2$, and the amount of chromate film was 5 mg/m$^2$ expressed in terms of chromium metal. In addition, in the processing method of the end surface of the can body member, the PET resin film and the adhesive layer, which were formed on the outer surface of the Ni-plated steel sheet, were evaporated and removed using a laser beam in an area having a width of 0.5 mm from the sheet edge on the side (side which becomes can end) on which the bottom cover and the Ni-plated steel sheet in which the PET resin film having a length of 110 mm and a width of 170 mm was laminated were seamed.

As the steel sheet material of No. 29 (can body member and can bottom member), a Ni-plated steel sheet (the same Ni-plate steel sheet as that of No. 27) which was manufactured similarly to No. 25 except for the processing method (processing method of end surface) of the can end on one side, and an Sn-plated steel sheet which was manufactured similarly to No. 25 except for the amount of Sn plating were used. That is, in the can bottom member, the amount of Sn plating (the amount of Sn metal plating) was 15.1 g/m$^2$, and the amount of chromate film was 5 mg/m$^2$ expressed in terms of chromium metal. In addition, in the processing method of the end surface of the can body member, the PET resin film and the adhesive layer, which were formed on the outer surface of the Ni-plated steel sheet, were evaporated and removed using a laser beam in an area having a width of 0.5 mm from the sheet edge on the side (side which becomes can end) on which the bottom cover and the Ni-plated steel sheet in which the PET resin film having a length of 110 mm and a width of 170 mm was laminated were seamed.

As the steel sheet material of No. 30 (can body member and can bottom member), a Ni-plated steel sheet (the same Ni-plated steel sheet as that of No. 26) which was manufactured similarly to No. 25 except for the processing method (processing method of end surface) of the can end on one side, and an Sn-plated steel sheet which was manufactured similarly to No. 25 except for the amount of Sn plating were used. That is, in the can bottom member, the amount of Sn plating (the amount of Sn metal plating) was 8.4 g/m$^2$, and the amount of chromate film was 5 mg/m$^2$ expressed in terms of chromium metal. In addition, in the processing method of the end surface of the can body member, the PET resin film and the adhesive layer, which were formed on the outer surface of the Ni-plated steel sheet, were mechanically removed using a grinder in an area having a width of 1 mm from the sheet edge on the side (side which becomes can end) on which the bottom cover and the Ni-plated steel sheet in which the PET resin film having a length of 110 mm and a width of 170 mm was laminated were seamed.

As the steel sheet material of No. 31 (can body member and can bottom member), a Ni-plated steel sheet (the same Ni-plate steel sheet as that of No. 27) which was manufactured similarly to No. 25 except for the processing method (processing method of end surface) of the can end on one side, and an Sn-plated steel sheet which was manufactured similarly to No. 25 except for the amount of chromate film were used. That is, in the can bottom member, the amount of Sn plating (the amount of Sn metal plating) was 11.2 g/m$^2$, and the amount of chromate film was 3 mg/m$^2$ expressed in terms of chromium metal. In addition, in the processing method of the end surface of the can body member, the PET resin film and the adhesive layer, which were formed on the outer surface of the Ni-plated steel sheet, were evaporated and removed using a laser beam in an area having a width of 0.5 mm from the sheet edge on the side (side which becomes can end) on which the bottom cover and the Ni-plated steel sheet in which the PET resin film having a length of 110 mm and a width of 170 mm was laminated were seamed.

As the steel sheet material of No. 32 (can body member and can bottom member), a Ni-plated steel sheet (the same Ni-plate steel sheet as that of No. 26) which was manufactured similarly to No. 25 except for the processing method (processing method of end surface) of the can end on one side, and an Sn-plated steel sheet which was manufactured similarly to No. 25 except for the amount of chromate film were used. That is, in the can bottom member, the amount of Sn plating (the amount of Sn metal plating) was 11.2 g/m$^2$, and the amount of chromate film was 8 mg/m$^2$ expressed in terms of chromium metal. In addition, in the processing method of the end surface of the can body member, the PET resin film and the adhesive layer, which were formed on the outer surface of the Ni-plated steel sheet, were mechanically removed using a grinder in an area having a width of 1 mm from the sheet edge on the side (side which becomes can end) on which the bottom cover and the Ni-plated steel sheet in which the PET resin film having a length of 110 mm and a width of 170 mm was laminated were seamed.

As the steel sheet material of No. 33 (can body member and can bottom member), a Ni-plated steel sheet which was manufactured similarly to No. 25 except for the amount of Ni plating and the processing method (processing method of end surface) of the can end on one side, and the same Sn-plated steel sheet as No. 25 were used. That is, in the can body member, the amount of Ni plating was 260 mg/m$^2$, and the amount of chromate film was 5 mg/m$^2$ expressed in terms of chromium metal. In addition, in the processing method of the end surface of the can body member, the PET resin film and the adhesive layer, which were formed on the outer surface of the Ni-plated steel sheet, were evaporated and removed using a laser beam in an area having a width of 0.5 mm from the sheet edge on the side (side which becomes can end) on which the bottom cover and the Ni-plated steel sheet in which the PET resin film having a length of 110 mm and a width of 170 mm was laminated were seamed.

As the steel sheet material of No. 34 (can body member and can bottom member), a Ni-plated steel sheet which was manufactured similarly to No. 25 except for the amount of Ni plating and the processing method (processing method of end surface) of the can end on one side, and the same Sn-plated steel as No. 25 were used. That is, in the can body member, the amount of Ni plating was 950 mg/m$^2$, and the amount of chromate film was 5 mg/m$^2$ expressed in terms of chromium metal. In addition, in the processing method of the end surface of the can body member, the PET resin film and the adhesive layer, which were formed on the outer surface of the Ni-plated steel sheet, were mechanically removed using a grinder in an area having a width of 1 mm from the sheet edge on the side (side which becomes can end) on which the bottom cover and the Ni-plated steel sheet in which the PET resin film having a length of 110 mm and a width of 170 mm was laminated were seamed.

As the steel sheet material of No. 35 (can body member and can bottom member), a Ni-plated steel sheet which was manufactured similarly to No. 25 except for the amount of chromate film and the processing method (processing method of end surface) of the can end on one side, and the same Sn-plated steel sheet as that of No. 25 were used. That is, in the can body member, the amount of Ni plating was 500 mg/m$^2$, and the amount of chromate film was 3 mg/m$^2$ expressed in terms of chromium metal. In addition, in the processing method of the end surface of the can body member, the PET resin film and the adhesive layer, which were formed on the outer surface of the Ni-plated steel sheet, were evaporated and removed using a laser beam in an area having a width of 0.5 mm from the sheet edge on the side (side which becomes can end) on which the bottom cover and the Ni-plated steel sheet in which the PET resin film having a length of 110 mm and a width of 170 mm was laminated were seamed.

As the steel sheet material of No. 36 (can body member and can bottom member), a Ni-plated steel sheet which was manufactured similarly to No. 25 except for the amount of chromate film and the processing method (processing method of end surface) of the can end on one side, and the same Sn-plated steel sheet as that of No. 25 were used. That is, in the can body member, the amount of Ni plating was 500 mg/m$^2$, and the amount of chromate film was 8 mg/m$^2$ expressed in terms of chromium metal. In addition, in the processing method of the end surface of the can body member, the PET resin film and the adhesive layer, which were formed on the outer surface of the Ni-plated steel sheet, were mechanically removed using a grinder in an area having a width of 1 mm from the sheet edge on the side (side which becomes can end) on which the bottom cover and the Ni-plated steel sheet in which the PET resin film having a length of 110 mm and a width of 170 mm was laminated were seamed.

As the steel sheet material of No. 37 (can body member and can bottom member), a Ni-plated steel sheet which was manufactured similarly to No. 25 except for the processing method (processing method of end surface) of the can end on one side, and the same Sn-plated steel sheet as that of No. 25 were used. That is, in the processing method of the end surface of the can body member, Ni-plated steel sheet in which the PET resin film having a length of 110 mm and a width of 170 mm was laminated was cut down so that the direction of the burr on the side (side which becomes can end, sheet edge) on which the bottom cover and the Ni-plated steel sheet was seamed became the direction of the inner surface of the can.

As the steel sheet material of No. 38 (can body member and can bottom member), a Ni-plated steel sheet (the same Ni-plated steel sheet as that of No. 26) which was manufactured similarly to No. 25 except for the processing method (processing method of end surface) of the can end on one side, and an Sn-plated steel sheet which was manufactured similarly to No. 25 except for the amount of Sn plating were used. That is, in the can bottom member, the amount of Sn plating (the amount of Sn metal plating) was 4.7 g/m$^2$, and the amount of chromate film was 5 mg/m$^2$ expressed in terms of chromium metal. In addition, in the processing method of the end surface of the can body member, the PET resin film and the adhesive layer, which were formed on the outer surface of Ni-plated steel sheet, were mechanically removed using a grinder in an area having a width of 1 mm from the sheet edge on the side (side which becomes can end) on which the bottom cover and the Ni-plated steel sheet in which the PET resin film having a length of 110 mm and a width of 170 mm was laminated were seamed.

As the steel sheet material of No. 39 (can body member and can bottom member), a Ni-plated steel sheet (the same Ni-plated steel sheet as that of No. 26) which was manufactured similarly to No. 25 except for the processing method (processing method of end surface) of the can end on one side, and an Sn-plated steel sheet which was manufactured similarly to No. 25 except for the amount of chromate film were used. That is, in the can bottom member, the amount of Sn plating (the amount of Sn metal plating) was 11.2 g/m$^2$, and the amount of chromate film was 1 mg/m$^2$ expressed in terms of chromium metal. In addition, in the processing method of the end surface of the can body member, the PET resin film and the adhesive layer, which were formed on the outer surface of Ni-plated steel sheet, were mechanically removed using a grinder in an area having a width of 1 mm from the sheet edge on the side (side which becomes can end) on which the bottom cover and the Ni-plated steel sheet in which the PET resin film having a length of 110 mm and a width of 170 mm was laminated were seamed.

As the steel sheet material of No. 40 (can body member and can bottom member), a Ni-plated steel sheet (the same Ni-plated steel sheet as that of No. 26) which was manufactured similarly to No. 25 except for the processing method (processing method of end surface) of the can end on one side, and an Sn-plated steel sheet which was manufactured similarly to No. 25 except for the amount of chromate film were used. That is, in the can bottom member, the amount of Sn plating (the amount of Sn metal plating) was 11.2 g/m$^2$, and the amount of chromate film was 12 mg/m$^2$ expressed in terms of chromium metal. In addition, in the processing method of the end surface of the can body member, the PET resin film and the adhesive layer, which were formed on the outer surface of Ni-plated steel sheet, were mechanically removed using a grinder in an area having a width of 1 mm from the sheet edge on the side (side which becomes can end) on which the bottom cover and the Ni-plated steel sheet in which the PET resin film having a length of 110 mm and a width of 170 mm was laminated were seamed.

As the steel sheet material of No. 41 (can body member and can bottom member), a Ni-plated steel sheet which was manufactured similarly to No. 25 except for the amount of Ni plating and the processing method (processing method of end surface) of the can end on one side, and the same Sn-plated steel sheet as that of No. 25 were used. That is, in the can body member, the amount of Ni plating was 150 mg/m$^2$, and the amount of chromate film was 5 mg/m$^2$ expressed in terms of chromium metal. In addition, in the processing method of the end surface of the can body member, the PET resin film and the adhesive layer, which were formed on the outer surface of Ni-plated steel sheet, were mechanically removed using a grinder in an area having a width of 1 mm from the sheet edge on the side (side which becomes can end) on which the bottom cover and the Ni-plated steel sheet in which the PET resin film having a length of 110 mm and a width of 170 mm was laminated were seamed.

As the steel sheet material of No. 42 (can body member and can bottom member), a Ni-plated steel sheet which was manufactured similarly to No. 25 except for the amount of chromate film and the processing method (processing method of end surface) of the can end on one side, and the same Sn-plated steel sheet as that of No. 25 were used. That is, in the can body member, the amount of Ni plating was 500 mg/m$^2$, and the amount of chromate film was 1 mg/m$^2$ expressed in terms of chromium metal. In addition, in the processing method of the end surface of the can body member, the PET resin film and the adhesive layer, which were formed on the outer surface of Ni-plated steel sheet, were mechanically removed using a grinder in an area having a width of 1 mm from the sheet edge on the side (side which becomes can end) on which the bottom cover and the Ni-plated steel sheet in which the PET resin film having a length of 110 mm and a width of 170 mm was laminated were seamed.

As the steel sheet material of No. 43 (can body member and can bottom member), a Ni-plated steel sheet which was manufactured similarly to No. 25 except for the amount of chromate film and the processing method (processing method of end surface) of the can end on one side, and the same Sn-plated steel sheet as that of No. 25 were used. That is, in the can body member, the amount of Ni plating was 500 mg/m$^2$, and the amount of chromate film was 12 mg/m$^2$ expressed in terms of chromium metal. In addition, in the processing method of the end surface of the can body member, the PET resin film and the adhesive layer, which were formed on the outer surface of Ni-plated steel sheet, were mechanically removed using a grinder in an area having a width of 1 mm from the sheet edge on the side (side which becomes can end) on which the bottom cover and the Ni-plated steel sheet in which the PET resin film having a length of 110 mm and a width of 170 mm was laminated were seamed.

In Nos. 25 to 43 described above, similarly to the estimation item (1), the weldability was estimated with respect to the can body member (here, Ni-plated steel sheet) using a welder of Soudronic AG Next, similarly to the estimation item (2), a threading was performed on the can end on one side of the cylindrical can body member, and the film adhesiveness of the formed portion was estimated. Moreover, similarly to the estimation item (3), a cap made of aluminum was covered on the can end (screw portion of can body member) subjected to the threading, and commercially available 100% orange juice (acidic beverages) was filled into the can body portion to which the cap made of aluminum was attached. Thereafter, a cover forming was performed on the Sn-plated steel sheet, and therefore, the can bottom member was manufactured. Moreover, the can bottom member and the other can end (opening portion) of the can body portion were seamed, and the corrosion resistance was estimated. In addition, in the estimation of the corrosion resistance of the estimation item (3), the long-term corrosion resistance of the can bottom member was also estimated. That is, after the corrosion resistance test, the can bottom were observed, and the corrosion resistance of the can bottom was estimated to be in one of four grades (A: corrosion was not observed, B: slight corrosion which was not a problem in practical use was observed, C: slight corrosion was observed, and D: severe corrosion was observed).

In Nos. 25 to 43 of Table 2, the following estimation item (5) was estimated in addition to the estimation items (1) to (3).

(5) Resistance Measurement

After the can bottom (bottom cover, can bottom member) and the can body (can body member) were seamed, the organic film (PET resin film and adhesive layer) and the chromate film of the outer surfaces of the can bottom and the can body were mechanically removed, and the resistance was measured.

The estimation results are shown in Table 2 along with the manufacturing conditions of the can (amount of Sn metal plating, amount of Ni plating, and amount of chromate film). Moreover, overall estimation (determined by the lowest rating) with respect to the estimation items (1) to (3) was also performed.

As shown in Table 2, in all the can main bodies of Nos. 25 to 36, the weldability, the appearance, the film adhesiveness of the screw formed portion, and the corrosion resistance (resistance to filiform corrosion) were sufficient. Moreover, in all the can main bodies of Nos. 37 to 40 and 43, the weldability, the appearance, the film adhesiveness of the screw formed portion, and the corrosion resistance (resistance to filiform corrosion) were of a level which was not a problem in practical use.

However, in the can main bodies of Nos. 25 to 36, since the resistance value between the can body and the can bottom was smaller than that of the can main body of No. 37, the corrosion resistance of the can body portion was higher than that of the can main body of No. 37. In addition, in the can main bodies of Nos. 26, 27, 29 to 36, since the resistance value between the can body and the can bottom was smaller than that of the can main body of No. 25, the corrosion resistance of the can body portion was higher than that of the can main body of No. 25.

Moreover, in the can main bodies of Nos. 25 to 36, since the amount of Sn plating (amount of Sn metal plating) of the can bottom member was heavier than that of the can main body of No. 38, the corrosion resistance of the can body portion was higher than that of the can main body of No. 38. In addition, in the can main bodies of Nos. 26, 27, 29 to 36, since the amount of Sn plating (amount of Sn metal plating) of the can bottom member was heavier than that of the can main body of No. 28, the corrosion resistance of the can body portion was higher than that of the can main body of No. 28.

Moreover, in the can main bodies of Nos. 26, 27, and 29 to 36, since the amount of chromate film of the can bottom member and the can body member was more optimally controlled compared to the can main bodies of Nos. 39, 40, 42, and 43, any one or more of the long-term corrosion resistance of the can bottom member, the corrosion resistance, the film adhesiveness, and the weldability of the can body member were further improved.

In the can main body of No. 41, since the amount of the metal plating in the welding portion of the can body member was not sufficient, the weldability of the can body member was not sufficient. In the can main body of No. 42, since the amount of chromate film of the can body member was not sufficient, the film adhesiveness of the screw formed portion of the can body member was not sufficient.

TABLE 2

| No. | Can bottom member Amount of Sn single metal plating (g/m²) | Amount of chromate film*¹ (mg/m²) | Can body member Amount of Ni plating (mg/m²) | Amount of chromate film*¹ (mg/m²) | Resistance between can body and can bottom (Ω) | Estimation results Weldability | Appearance of can bottom member after test | Long-term corrosion resistance of can bottom member | Film adhesiveness in screw formed portion | Corrosion resistance | Overall rating |
|---|---|---|---|---|---|---|---|---|---|---|---|
| 25 | 11.2 | 5 | 500 | 5 | 0.85 | A | A | A | A | B | B |
| 26 | 11.2 | 5 | 500 | 5 | 0.08 | A | A | A | A | A | A |
| 27 | 11.2 | 5 | 500 | 5 | 0.05 | A | A | A | A | A | A |
| 28 | 5.6 | 5 | 500 | 5 | 0.05 | A | B | A | A | B | B |
| 29 | 15.1 | 5 | 500 | 5 | 0.05 | A | A | A | A | A | A |
| 30 | 8.4 | 5 | 500 | 5 | 0.05 | A | A | A | A | A | A |
| 31 | 11.2 | 3 | 500 | 5 | 0.05 | A | A | A | A | A | A |
| 32 | 11.2 | 8 | 500 | 5 | 0.05 | A | A | A | A | A | A |
| 33 | 11.2 | 5 | 260 | 5 | 0.05 | A | A | A | A | A | A |
| 34 | 11.2 | 5 | 950 | 5 | 0.05 | A | A | A | A | A | A |
| 35 | 11.2 | 5 | 500 | 3 | 0.04 | A | A | A | A | A | A |
| 36 | 11.2 | 5 | 500 | 8 | 0.06 | A | A | A | A | A | A |
| 37 | 11.2 | 5 | 500 | 5 | 1.2 | A | A | A | A | C | C |
| 38 | 4.7 | 5 | 500 | 5 | 0.05 | A | C | A | A | C | C |
| 39 | 11.2 | 1 | 500 | 5 | 0.05 | A | A | C | A | A | C |
| 40 | 11.2 | 12 | 500 | 5 | 0.05 | A | A | A | A | C | C |
| 41 | 11.2 | 5 | 150 | 5 | 0.05 | D | A | A | A | B | D |
| 42 | 11.2 | 5 | 500 | 1 | 0.04 | A | A | A | D | C | D |
| 43 | 11.2 | 5 | 500 | 12 | 0.07 | C | A | A | A | A | C |

* Underlines in this table indicate that the underlined cells do not satisfy conditions according to the present invention.
*¹Amount of chromate film is equivalent to the amount in chromium metal.

In addition, in order to further improve the corrosion resistance of the can body member, a can main body was manufactured, which included an adhesive layer containing Sn metal particles in the can body member shown in Nos. 44 to 63 of Table 3.

Moreover, a composition of the polyester resin film used in Nos. 44 to 63 was the following.

Film of Polyester Resin A: Mixture of 98 mass % polyethylene terephthalate and 2 mass % polyethylene terephthalate-polytetramethylene glycol ether block copolymer (film A in Table 3)

Film of Polyester Resin B: Mixture of 95 mass % polyethylene terephthalate and 5 mass % poly-(ethylene glycol-neopentyl glycol-cyclohexane dimethanol) ester copolymer (film B in Table 3).

Film of Polyester Resin C: Mixture of 90 mass % polyethylene terephthalate and 10 mass % polyethylene terephthalate-polyethylene glycol ether random copolymer (PEG (polyethylene glycol) content 2 mol %) (film C in Table 3).

Moreover, as the adhesive (adhesive layer) used in Nos. 44 to 63, polyester which was a thermoplastic resin (adhesive resin I in Table 3) and polyester-epoxy and blocked isocyanate curing agent which were a thermosetting resin (adhesive resin II in Table 3) were used.

The polyester resin film and the adhesive layer used in the can body member of No. 44 were manufactured according to the following method. After the thermoplastic resin (polyester resin) in which Sn metal particles having a mean particle diameter of 2.4 μm were dispersed was coated on one surface of the film of the polyester resin A having a thickness of 12 μm, the surface was dried, and a film 1 of the polyester resin A was manufactured. The amount of Sn metal particles was 1500 mg/m$^2$, and the mean coated film thickness at five points of the adhesive layer was 5 μm. In addition, after the thermosetting resin (polyester-epoxy resin, blocked isocyanate curing agent) in which Sn metal particles were not contained was coated on one surface of the film of the polyester resin A having a thickness of 12 μm, the surface was dried, and a film 0 of the polyester resin A was manufactured. The mean coated film thickness at five points of the adhesive layer was 5 μm.

The Ni-plated steel sheet used in the can body member of No. 44 was manufactured according to the following method (corresponding to the Manufacturing Method 1). Ni plating was applied to both surfaces of a sheet to be plated (steel sheet) which was subjected to annealing and skin pass after cold rolling and had a thickness of 0.19 mm, by applying a current of a current density of 1 A/dm$^2$ in a solution of 45° C. and pH 4 including Ni ions of 40 g/L using Ni sulfate and boric acid. Subsequently, by performing chromate treatment with respect to both surfaces of the steel sheet through cathode electrolysis at a current density of 5 A/dm$^2$ in a solution of 100 g/L chromic acid and 1 g/L sulfuric acid at 45° C., the Ni-plated steel sheet was manufactured. The amount of Ni plating was 500 mg/m$^2$ and the amount of chromate film was 5 mg/m$^2$ expressed in terms of Cr metal.

The Ni-plated steel sheet was cut down to a length of 110 mm and a width of 170 mm, subsequently, the cut steel sheet was heated to 180° C., thereafter, the film 1 of the polyester resin A was bonded to one surface by thermal compression and the film 0 of the polyester resin A was bonded to the other surface by thermal compression so that the adhesive layer contacted the surface of the steel sheet except for the vicinity of the vertical edges which becomes the portions to be welded, and the Ni-plated steel sheet (resin film laminated steel sheet 1) for the can body member was manufactured.

The polyester resin film and the adhesive layer used in the can body member of No. 45 were manufactured according to the following method. After the thermosetting resin (polyester-epoxy resin, blocked isocyanate curing agent) in which Sn metal particles having a mean particle diameter of 6.6 μm were dispersed was coated on one surface of the film of the polyester resin A having a thickness of 12 μm, the surface was dried, and a film 2 of the polyester resin A was manufactured. The amount of Sn metal particles was 1500 mg/m$^2$, and the mean coated film thickness at five points of the adhesive layer was 5 μm. In addition, after the thermosetting resin (polyester-epoxy resin, blocked isocyanate curing agent) in which Sn metal particles were not contained was coated on one surface of the film of the polyester resin A having a thickness of 12 μm, the surface was dried, and a film 0 of the polyester resin A was manufactured. A mean coated film thickness at five points of the adhesive layer was 5 μm.

As the steel sheet material of No. 45 (can body member and the can bottom member), the Ni-plated steel sheet similar to that of No. 44 was used. That is, the amount of Ni plating was 500 m g/m$^2$ and the amount of chromate film was 5 mg/m$^2$ expressed in terms of Cr metal.

The steel sheet material having a length of 110 mm and a width of 170 mm was heated to 180° C., thereafter, the film 2 of the polyester resin A was bonded to one surface by thermal compression and the film 0 of the polyester resin A was bonded to the other surface by thermal compression so that the adhesive layer contacted the surface of the steel sheet, and the Ni-plated steel sheet (resin film laminated steel sheet 2) for the can body member was manufactured.

The polyester resin film and the adhesive layer used in the can body member of No. 46 were manufactured according to the following method. After the thermosetting resin (polyester-epoxy resin, blocked isocyanate curing agent) in which Sn metal particles having a mean particle diameter of 3.5 μm were dispersed was coated on one surface of the film of the polyester resin A having a thickness of 12 μm, the surface was dried, and a film 3 of the polyester resin A was manufactured. The amount of Sn metal particles was 1500 mg/m$^2$, and the mean coated film thickness at five points of the adhesive layer was 5 μm. In addition, after the thermosetting resin (polyester-epoxy resin, blocked isocyanate curing agent) in which Sn metal particles were not contained was coated on one surface of the PET film having a thickness of 20 μm, the surface was dried, and a film 0 of the polyester resin A was manufactured. The mean coated film thickness at five points of the adhesive layer was 5 μm.

As the steel sheet material of No. 46 (can body member and the can bottom member), a Ni-plated steel sheet similar to that of No. 44 was used. That is, the amount of Ni plating was 500 mg/m$^2$ and the amount of chromate film was 5 mg/m$^2$ expressed in terms of Cr metal.

The steel sheet material having a length of 110 mm and a width of 170 mm was heated to 180° C., thereafter, the film 3 of the polyester resin A was bonded to one surface by thermal compression and the film 0 of the polyester resin A was bonded to the other surface by thermal compression so that the adhesive layer contacted the surface of the steel sheet, and the Ni-plated steel sheet (resin film laminated steel sheet 3) for the can body member was manufactured.

The polyester resin film and the adhesive layer used in the can body member of No. 47 were manufactured according to the following method. After the thermosetting resin (polyester-epoxy resin, blocked isocyanate curing agent) in which Sn metal particles having a mean particle diameter of 5.5 μm were dispersed was coated on one surface of the film of the polyester resin A having a thickness of 12 μm, the surface was dried, and a film 4 of the polyester resin A was manufactured. The amount of Sn metal particles was 1500 mg/m$^2$, and the mean coated film thickness at five points of the adhesive layer was 5 μm. In addition, after the thermosetting resin (polyester-epoxy resin, blocked isocyanate curing agent) in which Sn metal particles were not contained was coated on one surface of the film of the polyester resin A having a thickness of 20 μm, the surface was dried, and a film 0 of the polyester resin A was manufactured. A mean coated film thickness at five points of the adhesive layer was 5 μm.

As the steel sheet material of No. 47 (can body member and the can bottom member), a Ni-plated steel sheet similar to that of No. 44 was used. That is, the amount of Ni plating was 500 mg/m$^2$ and the amount of chromate film was 5 mg/m$^2$ expressed in terms of Cr metal.

The steel sheet material having a length of 110 mm and a width of 170 mm was heated to 180° C., thereafter, the film 4 of the polyester resin A was bonded to one surface by thermal compression and the film 0 of the polyester resin A was bonded to the other surface by thermal compression so that the adhesive layer contacted the surface of the steel sheet, and the Ni-plated steel sheet (resin film laminated steel sheet 4) for the can body member was manufactured.

The polyester resin film and the adhesive layer used in the can body member of No. 48 were manufactured according to the following method. After the thermosetting resin (polyester-epoxy resin, blocked isocyanate curing agent) in which Sn metal particles having a mean particle diameter of 4.0 μm were dispersed was coated on one surface of the film of the polyester resin A having a thickness of 12 μm, the surface was dried, and a film 5 of the polyester resin A was manufactured. The amount of Sn metal particles was 200 mg/m$^2$, and the mean coated film thickness at five points of the adhesive layer was 5 μm. In addition, after the thermosetting resin (polyester-epoxy resin, blocked isocyanate curing agent) in which Sn metal particles were not contained was coated on one surface of the film of the polyester resin A having a thickness of 20 μm, the surface was dried, and a film 0 of the polyester resin A was manufactured. The mean coated film thickness at five points of the adhesive layer was 5 μm.

As the steel sheet material of No. 48 (can body member and the can bottom member), a Ni-plated steel sheet similar to that of No. 44 was used. That is, the amount of Ni plating was 500 mg/m$^2$ and the amount of chromate film was 5 mg/m$^2$ expressed in terms of Cr metal.

The steel sheet material having a length of 110 mm and a width of 170 mm was heated to 180° C., thereafter, the film 5 of the polyester resin A was bonded to one surface by thermal compression and the film 0 of the polyester resin A was bonded to the other surface by thermal compression so that the adhesive layer contacted the surface of the steel sheet, and the Ni-plated steel sheet (resin film laminated steel sheet 5) for the can body member was manufactured.

The polyester resin film and the adhesive layer used in the can body member of No. 49 were manufactured according to the following method. After the thermosetting resin (polyester-epoxy resin, blocked isocyanate curing agent) in which Sn metal particles having a mean particle diameter of 4.0 μm were dispersed was coated on one surface of the film of the polyester resin A having a thickness of 12 μm, the surface was dried, and a film 6 of the polyester resin A was manufactured. The amount of Sn metal particles was 3400 mg/m$^2$, and the mean coated film thickness at five points of the adhesive layer was 5 μm. In addition, after the thermosetting resin (polyester-epoxy resin, blocked isocyanate curing agent) in which Sn metal particles were not contained was coated on one surface of the film of the polyester resin A having a thickness of 20 μm, the surface was dried, and a film 0 of the polyester resin A was manufactured. The mean coated film thickness at five points of the adhesive layer was 5 μm.

As the steel sheet material of No. 49 (can body member and the can bottom member), a Ni-plated steel sheet similar to that of No. 44 was used. That is, the amount of Ni plating was 500 mg/m$^2$ and the amount of the chromate film was 5 mg/m$^2$ expressed in terms of Cr metal.

The steel sheet material having a length of 110 mm and a width of 170 mm was heated to 180° C., thereafter, the film 6 of the polyester resin A was bonded to one surface by thermal compression and the film 0 of the polyester resin A was bonded to the other surface by thermal compression so that the adhesive layer contacted the surface of the steel sheet, and the Ni-plated steel sheet (resin film laminated steel sheet 6) for the can body member was manufactured.

The polyester resin film and the adhesive layer used in the can body member of No. 50 were manufactured according to the following method. After the thermosetting resin (polyester-epoxy resin, blocked isocyanate curing agent) in which Sn metal particles having a mean particle diameter of 4.0 μm were dispersed was coated on one surface of the film of the polyester resin A having a thickness of 12 μm, the surface was dried, and a film 7 of the polyester resin A was manufactured. The amount of Sn metal particles was 400 mg/m$^2$, and the mean coated film thickness at five points of the adhesive layer was 5 μm. In addition, after the thermosetting resin (polyester-epoxy resin, blocked isocyanate curing agent) in which Sn metal particles were not contained was coated on one surface of the film of the polyester resin A having a thickness of 20 μm, the surface was dried, and a film 0 of the polyester resin A was manufactured. The mean coated film thickness at five points of the adhesive layer was 5 μm.

As the steel sheet material of No. 50 (can body member and the can bottom member), a Ni-plated steel sheet similar to that of No. 44 was used. That is, the amount of Ni plating was 500 mg/m$^2$ and the amount of chromate film was 5 mg/m$^2$ expressed in terms of Cr metal.

The steel sheet material having a length of 110 mm and a width of 170 mm was heated to 180° C., thereafter, the film 7 of the polyester resin A was bonded to one surface by thermal compression and the film 0 of the polyester resin A was bonded to the other surface by thermal compression so that the adhesive layer contacted the surface of the steel sheet, electron beams were radiated on the surface of the film 7 of the polyester resin A by 3.5 Mrad, and the Ni-plated steel sheet (resin film laminated steel sheet 7) for the can body member was manufactured.

The polyester resin film and the adhesive layer used in the can body member of No. 51 was manufactured according to the following method. After the thermosetting resin (polyester-epoxy resin, blocked isocyanate curing agent) in which Sn metal particles having a mean particle diameter of 4.0 μm were dispersed was coated on one surface of the film of the polyester resin A having a thickness of 12 μm, the surface was dried, and a film 8 of the polyester resin A was manufactured. The amount of Sn metal particles was 1800 mg/m$^2$, and the mean coated film thickness at five points of the adhesive layer was 5 μm. In addition, after the thermosetting resin (polyester-epoxy resin, blocked isocyanate curing agent) in which Sn metal particles were not contained was coated on one surface of the film of the polyester resin A having a thickness of 20 μm, the surface was dried, and a film 0 of the polyester resin A was manufactured. The mean coated film thickness at five points of the adhesive layer was 5 μm.

As the steel sheet material of No. 51 (can body member and the can bottom member), a Ni-plated steel sheet similar to that of No. 44 was used. That is, the amount of Ni plating was 500 mg/m$^2$ and the amount of chromate film was 5 mg/m$^2$ expressed in terms of Cr metal.

The steel sheet material having a length of 110 mm and a width of 170 mm was heated to 180° C., thereafter, the film 8 of the polyester resin A was bonded to one surface by thermal compression and the film 0 of the polyester resin A was bonded to the other surface by thermal compression so that the adhesive layer contacted the surface of the steel sheet, and the Ni-plated steel sheet (resin film laminated steel sheet 8) for the can body member was manufactured.

The polyester resin film and the adhesive layer used in the can body member of No. 52 was manufactured according to the following method. After the thermosetting resin (polyester-epoxy resin, blocked isocyanate curing agent) in which Sn metal particles having a mean particle diameter of 4.0 μm were dispersed was coated on one surface of the film of the polyester resin A having a thickness of 12 μm, the surface was dried, and a film 9 of the polyester resin A was manufactured. The amount of Sn metal particles was 1500 mg/m$^2$, and the mean coated film thickness at five points of the adhesive layer was 5 μm. In addition, after the thermosetting resin (polyester-epoxy resin, blocked isocyanate curing agent) in which Sn metal particles were not contained was coated on one surface of the film of the polyester resin A having a thickness of 20 μm, the surface was dried, and a film 0 of the polyester resin A was manufactured. The mean coated film thickness at five points of the adhesive layer was 5 μm.

As the steel sheet material of No. 52 (can body member and the can bottom member), a Ni-plated steel sheet similar to that of No. 44 was used. That is, the amount of Ni plating was 500 mg/m$^2$ and the amount of chromate film was 5 mg/m$^2$ expressed in terms of Cr metal.

The steel sheet material having a length of 110 mm and a width of 170 mm was heated to 180° C., thereafter, the film 9 of the polyester resin A was bonded to one surface by thermal compression and the film 0 of the polyester resin A was bonded to the other surface by thermal compression so that the adhesive layer contacted the surface of the steel sheet, and the Ni-plated steel sheet (resin film laminated steel sheet 9) for the can body member was manufactured.

The polyester resin film and the adhesive layer used in the can body member of No. 53 was manufactured according to the following method. After the thermosetting resin (polyester-epoxy resin, blocked isocyanate curing agent) in which Sn metal particles having a mean particle diameter of 4.0 μm were dispersed was coated on one surface of the film of the polyester resin A having a thickness of 12 μm, the surface was dried, and a film 10 of the polyester resin A was manufactured. The amount of Sn metal particles was 1500 mg/m$^2$, and the mean coated film thickness at five points of the adhesive layer was 5 μm. In addition, after the thermosetting resin (polyester-epoxy resin, blocked isocyanate curing agent) in which Sn metal particles were not contained was coated on one surface of the film of the polyester resin A having a thickness of 20 μm, the surface was dried, and a film 0 of the polyester resin A was manufactured. The mean coated film thickness at five points of the adhesive layer was 5 μm.

As the steel sheet material of No. 53 (can body member and the can bottom member), a Ni-plated steel sheet manufactured similarly to that of No. 44 except for the amount of Ni plating was used. The amount of Ni plating was 260 mg/m$^2$ and the amount of chromate film was 5 mg/m$^2$ expressed in terms of Cr metal.

The steel sheet material having a length of 110 mm and a width of 170 mm was heated to 180° C., thereafter, the film 10 of the polyester resin A was bonded to one surface by thermal compression and the film 0 of the polyester resin A was bonded to the other surface by thermal compression so that the adhesive layer contacted the surface of the steel sheet, and a Ni-plated steel sheet (resin film laminated steel sheet 10) for the can body member was manufactured.

The polyester resin film and the adhesive layer used in the can body member of No. 54 were manufactured according to the following method. After the thermosetting resin (polyester-epoxy resin, blocked isocyanate curing agent) in which Sn metal particles having a mean particle diameter of 4.0 μm were dispersed was coated on one surface of the film of the polyester resin A having a thickness of 12 μm, the surface was dried, and a film 11 of the polyester resin A was manufactured. The amount of Sn metal particles was 1500 mg/m$^2$, and the mean coated film thickness at five points of the adhesive layer was 5 μm. In addition, after the thermosetting resin (polyester-epoxy resin, blocked isocyanate curing agent) in which Sn metal particles were not contained was coated on one surface of the film of the polyester resin A having a thickness of 20 μm, the surface was dried, and a film 0 of the polyester resin A was manufactured. The mean coated film thickness at five points of the adhesive layer was 5 μm.

As the steel sheet material of No. 54 (can body member and the can bottom member), a Ni-plated steel sheet manufactured similarly to that of No. 44 except for the amount of Ni plating was used. The amount of Ni plating was 950 mg/m$^2$ and the amount of chromate film was 5 mg/m$^2$ expressed in terms of Cr metal.

The steel sheet material having a length of 110 mm and a width of 170 mm was heated to 180° C., thereafter, the film 11 of the polyester resin A was bonded to one surface by thermal compression and the film 0 of the polyester resin A was bonded to the other surface by thermal compression so that the adhesive layer contacted the surface of the steel sheet, and the Ni-plated steel sheet (resin film laminated steel sheet 11) for the can body member was manufactured.

The polyester resin film and the adhesive layer used in the can body member of No. 55 were manufactured according to the following method. After the thermosetting resin (polyester-epoxy resin, blocked isocyanate curing agent) in which Sn metal particles having a mean particle diameter of 4.0 μm were dispersed was coated on one surface of the film of the polyester resin B having a thickness of 12 μm, the surface was dried, and a film 12 of the polyester resin B was manufactured. The amount of Sn metal particles was 1500 mg/m$^2$, and the mean coated film thickness at five points of the adhesive layer was 5 μm. In addition, after the thermosetting resin (polyester-epoxy resin, blocked isocyanate curing agent) in which Sn metal particles were not contained was coated on one surface of the film of the polyester resin B having a thickness of 20 μm, the surface was dried, and a film 0 of the polyester resin B was manufactured. The mean coated film thickness at five points of the adhesive layer was 5 μm.

As the steel sheet material of No. 55 (can body member and the can bottom member), a Ni-plated steel sheet manufactured similarly to that of No. 44 except for the amount of chromate film was used. The amount of Ni plating was 500 mg/m$^2$ and the amount of chromate film was 3 mg/m$^2$ expressed in terms of Cr metal.

The steel sheet material having a length of 110 mm and a width of 170 mm was heated to 180° C., thereafter, the film 12 of the polyester resin B was bonded to one surface by thermal compression and the film 0 of the polyester resin B was bonded to the other surface by thermal compression so that the adhesive layer contacted the surface of the steel sheet, and the Ni-plated steel sheet (resin film laminated steel sheet 12) for the can body member was manufactured.

The polyester resin film and the adhesive layer used in the can body member of No. 56 was manufactured according to the following method. After the thermosetting resin (polyester-epoxy resin, blocked isocyanate curing agent) in which Sn metal particles having a mean particle diameter of 4.0 μm were dispersed was coated on one surface of the film of the polyester resin C having a thickness of 12 μm, the surface was dried, and a film 13 of the polyester resin C was manufactured. The amount of Sn metal particles was 1500 mg/m$^2$, and the mean coated film thickness at five points of the adhesive layer was 5 μm. In addition, after the thermosetting resin (polyester-epoxy resin, blocked isocyanate curing agent) in which Sn metal particles were not contained was coated on one surface of the film of the polyester resin C having a thickness of 20 μm, the surface was dried, and a film 0 of the polyester resin C was manufactured. The mean coated film thickness at five points of the adhesive layer was 5 μm.

As the steel sheet material of No. 56 (can body member and the can bottom member), a Ni-plated steel sheet manufactured similarly to that of No. 44 except for the amount of chromate film was used. The amount of Ni plating was 500 mg/m² and the amount of chromate film was 8 mg/m² expressed in terms of Cr metal.

The steel sheet material having a length of 110 mm and a width of 170 mm was heated to 180° C., thereafter, the film 13 of the polyester resin C was bonded to one surface by thermal compression and the film 0 of the polyester resin C was bonded to the other surface by thermal compression so that the adhesive layer contacted the surface of the steel sheet, and the Ni-plated steel sheet (resin film laminated steel sheet 13) for the can body member was manufactured.

The polyester resin film and the adhesive layer used in the can body member of No. 57 was manufactured according to the following method. After the thermosetting resin (polyester-epoxy resin, blocked isocyanate curing agent) in which Sn metal particles having a mean particle diameter of 1.5 μm were dispersed was coated on one surface of the film of the polyester resin A having a thickness of 12 μm, the surface was dried, and a film 21 of the polyester resin A was manufactured. The amount of Sn metal particles was 1500 mg/m², and the mean coated film thickness at five points of the adhesive layer was 5 μm. In addition, after the thermosetting resin (polyester-epoxy resin, blocked isocyanate curing agent) in which Sn metal particles were not contained was coated on one surface of the film of the polyester resin A having a thickness of 20 μm, the surface was dried, and a film 0 of the polyester resin A was manufactured. The mean coated film thickness at five points of the adhesive layer was 5 μm.

As the steel sheet material of No. 57 (can body member and the can bottom member), a Ni-plated steel sheet similar to that of No. 44 was used. That is, the amount of Ni plating was 500 mg/m² and the amount of chromate film was 5 mg/m² expressed in terms of Cr metal.

The steel sheet material having a length of 110 mm and a width of 170 mm was heated to 180° C., thereafter, the film 21 of the polyester resin A was bonded to one surface by thermal compression and the film 0 of the polyester resin A was bonded to the other surface by thermal compression so that the adhesive layer contacted the surface of the steel sheet, and the Ni-plated steel sheet (resin film laminated steel sheet 21) for the can body member was manufactured.

The polyester resin film and the adhesive layer used in the can body member of No. 58 was manufactured according to the following method. After the thermosetting resin (polyester-epoxy resin, blocked isocyanate curing agent) in which Sn metal particles having a mean particle diameter of 8.0 μm were dispersed was coated on one surface of the film of the polyester resin A having a thickness of 12 μm, the surface was dried, and a film 22 of the polyester resin A was manufactured. The amount of Sn metal particles was 1500 mg/m², and the mean coated film thickness at five points of the adhesive layer was 5 μm. In addition, after the thermosetting resin (polyester-epoxy resin, blocked isocyanate curing agent) in which Sn metal particles were not contained was coated on one surface of the film of the polyester resin A having a thickness of 20 μm, the surface was dried, and a film 0 of the polyester resin A was manufactured. The mean coated film thickness at five points of the adhesive layer was 5 μm.

As the steel sheet material of No. 58 (can body member and the can bottom member), a Ni-plated steel sheet similar to that of No. 44 was used. That is, the amount of Ni plating was 500 mg/m² and the amount of chromate film was 5 mg/m² expressed in terms of Cr metal.

The steel sheet material having a length of 110 mm and a width of 170 mm was heated to 180° C., thereafter, the film 22 of the polyester resin A was bonded to one surface by thermal compression and the film 0 of the polyester resin A was bonded to the other surface by thermal compression so that the adhesive layer contacted the surface of the steel sheet, and the Ni-plated steel sheet (resin film laminated steel sheet 22) for the can body member was manufactured.

The polyester resin film and the adhesive layer used in the can body member of No. 59 were manufactured according to the following method. After the thermosetting resin (polyester-epoxy resin, blocked isocyanate curing agent) in which Sn metal particles having a mean particle diameter of 4.0 μm were dispersed was coated on one surface of the film of the polyester resin A having a thickness of 12 μm, the surface was dried, and a film 23 of the polyester resin A was manufactured. The amount of Sn metal particles was 50 mg/m², and the mean coated film thickness at five points of the adhesive layer was 5 μm. In addition, after the thermosetting resin (polyester-epoxy resin, blocked isocyanate curing agent) in which Sn metal particles were not contained was coated on one surface of the film of the polyester resin A having a thickness of 20 μm, the surface was dried, and a film 0 of the polyester resin A was manufactured. The mean coated film thickness at five points of the adhesive layer was 5 μm.

As the steel sheet material of No. 59 (can body member and the can bottom member), a Ni-plated steel sheet similar to that of No. 44 was used. That is, the amount of Ni plating was 500 mg/m² and the amount of chromate film was 5 mg/m² expressed in terms of Cr metal.

The steel sheet material having a length of 110 mm and a width of 170 mm was heated to 180° C., thereafter, the film 23 of the polyester resin A was bonded to one surface by thermal compression and the film 0 of the polyester resin A was bonded to the other surface by thermal compression so that the adhesive layer contacted the surface of the steel sheet, and the Ni-plated steel sheet (resin film laminated steel sheet 23) for the can body member was manufactured.

The polyester resin film and the adhesive layer used in the can body member of No. 60 was manufactured according to the following method. After the thermosetting resin (polyester-epoxy resin, blocked isocyanate curing agent) in which Sn metal particles having a mean particle diameter of 4.0 μm were dispersed was coated on one surface of the film of the polyester resin A having a thickness of 12 μm, the surface was dried, and a film 24 of the polyester resin A was manufactured. The amount of Sn metal particles was 4000 mg/m², and the mean coated film thickness at five points of the adhesive layer was 5 μm. In addition, after the thermosetting resin (polyester-epoxy resin, blocked isocyanate curing agent) in which Sn metal particles were not contained was coated on one surface of the film of the polyester resin A having a thickness of 20 μm, the surface was dried, and a film 0 of the polyester resin A was manufactured. The mean coated film thickness at five points of the adhesive layer was 5 μm.

As the steel sheet material of No. 60 (can body member and the can bottom member), a Ni-plated steel sheet similar to that of No. 44 was used. That is, the amount of Ni plating was 500 mg/m² and the amount of chromate film was 5 mg/m² expressed in terms of Cr metal.

The steel sheet material having a length of 110 mm and a width of 170 mm was heated to 180° C., thereafter, the film 24 of the polyester resin A was bonded to one surface by thermal compression and the film 0 of the polyester resin A was bonded to the other surface by thermal compression so that the adhesive layer contacted the surface of the steel sheet, and the Ni-plated steel sheet (resin film laminated steel sheet 24) for the can body member was manufactured.

The polyester resin film and the adhesive layer used in the can body member of No. 61 were manufactured according to the following method. After the thermosetting resin (polyester-epoxy resin, blocked isocyanate curing agent) in which Sn metal particles having a mean particle diameter of 4.0 μm were dispersed was coated on one surface of the film of the polyester resin A having a thickness of 12 μm, the surface was dried, and a film 25 of the polyester resin A was manufactured. The amount of Sn metal particles was 1500 mg/m$^2$, and the mean coated film thickness at five points of the adhesive layer was 5 μm. In addition, after the thermosetting resin (polyester-epoxy resin, blocked isocyanate curing agent) in which Sn metal particles were not contained was coated on one surface of the film of the polyester resin A having a thickness of 20 μm, the surface was dried, and a film 0 of the polyester resin A was manufactured. The mean coated film thickness at five points of the adhesive layer was 5 μm.

As the steel sheet material of No. 61 (can body member and the can bottom member), a Ni-plated steel sheet manufactured similarly to that of No. 44 except for the amount of Ni plating was used. The amount of Ni plating was 150 mg/m$^2$ and the amount of chromate film was 5 mg/m$^2$ expressed in terms of Cr metal.

The steel sheet material having a length of 110 mm and a width of 170 mm was heated to 180° C., thereafter, the film 25 of the polyester resin A was bonded to one surface by thermal compression and the film 0 of the polyester resin A was bonded to the other surface by thermal compression so that the adhesive layer contacted the surface of the steel sheet, and the Ni-plated steel sheet (resin film laminated steel sheet 25) for the can body member was manufactured.

The polyester resin film and the adhesive layer used in the can body member of No. 62 were manufactured according to the following method. After the thermosetting resin (polyester-epoxy resin, blocked isocyanate curing agent) in which Sn metal particles having a mean particle diameter of 4.0 μm were dispersed was coated on one surface of the film of the polyester resin A having a thickness of 12 μm, the surface was dried, and a film 26 of the polyester resin A was manufactured. The amount of Sn metal particles was 1500 mg/m$^2$, and the mean coated film thickness at five points of the adhesive layer was 5 μm. In addition, after the thermosetting resin (polyester-epoxy resin, blocked isocyanate curing agent) in which Sn metal particles were not contained was coated on one surface of the film of the polyester resin A having a thickness of 20 μm, the surface was dried, and a film 0 of the polyester resin A was manufactured. The mean coated film thickness at five points of the adhesive layer was 5 μm.

As the steel sheet material of No. 62 (can body member and the can bottom member), a Ni-plated steel sheet manufactured similarly to that of No. 44 except for the amount of chromate film was used. The amount of Ni plating was 500 mg/m$^2$ and the amount of chromate film was 1 mg/m$^2$ expressed in terms of Cr metal.

The steel sheet material having a length of 110 mm and a width of 170 mm was heated to 180° C., thereafter, the film 26 of the polyester resin A was bonded to one surface by thermal compression and the film 0 of the polyester resin A was bonded to the other surface by thermal compression so that the adhesive layer contacted the surface of the steel sheet, and the Ni-plated steel sheet (resin film laminated steel sheet 26) for the can body member was manufactured.

The polyester resin film and the adhesive layer used in the can body member of No. 63 were manufactured according to the following method. After the thermosetting resin (polyester-epoxy resin, blocked isocyanate curing agent) in which Sn metal particles having a mean particle diameter of 4.0 μm were dispersed was coated on one surface of the film of the polyester resin A having a thickness of 12 μm, the surface was dried, and a film 27 of the polyester resin A was manufactured. The amount of Sn metal particles was 1500 mg/m$^2$, and the mean coated film thickness at five points of the adhesive layer was 5 μm. In addition, after the thermosetting resin (polyester-epoxy resin, blocked isocyanate curing agent) in which Sn metal particles were not contained was coated on one surface of the film of the polyester resin A having a thickness of 20 μm, the surface was dried, and a film 0 of the polyester resin A was manufactured. The mean coated film thickness at five points of the adhesive layer was 5 μm.

As the steel sheet material of No. 63 (can body member and the can bottom member), a Ni-plated steel sheet manufactured similarly to that of No. 44 except for the amount of chromate film was used. The amount of Ni plating was 500 mg/m$^2$ and the amount of chromate film was 12 mg/m$^2$ expressed in terms of Cr metal.

The steel sheet material having a length of 110 mm and a width of 170 mm was heated to 180° C., thereafter, the film 27 of the polyester resin A was bonded to one surface by thermal compression and the film 0 of the polyester resin A was bonded to the other surface by thermal compression so that the adhesive layer contacted the surface of the steel sheet, and the Ni-plated steel sheet (resin film laminated steel sheet 27) for the can body member was manufactured.

In Nos. 44 to 63, the following estimation item (6) was also estimated in addition to the estimation items (1) to (3).

Moreover, in order to accurately estimate the corrosion resistance, as the can bottom member, an Sn-plated steel sheet was used in which Ni plating was applied to the steel sheet surface, Sn plating was applied to the Ni-plating surface, and electrolytic chromic acid treatment was performed on the Sn-plating surface of, and the item (3) of the estimation method was estimated. In the Sn-plated steel sheet, the amount of Ni plating was 50 mg/m$^2$, the amount of Sn metal plating was 1000 mg/m$^2$, the amount of Cr metal was 10 mg/m$^2$, and the amount of hydrated chromium oxide expressed in terms of Cr metal was 7 mg/m$^2$. In this case, the corrosion resistance of only the can body member can be ascertained, and the corrosion resistance of the can body member over the longer term can be understood in as short a time as possible.

(6) Color Measurement (Film Appearance)

Colors of the manufactured various polyester resin film laminated-steel sheets (steel sheet of can body member) were measured by a micro spectrophotometer VSS 400 manufactured by Nippon Denshoku Industries Co., Ltd. The range of the measured area was set to φ0.5 mm.

Compared to L value (film appearance) of a case where the Sn metal particles were not contained, the case where a decrease in the L value was less than 2 was evaluated as "A (good)", the case where a decrease in the L value was equal to or more than 2 and less than 5 was evaluated as "B (usable in practice), and the case where a decrease in the L value was more than 5 was evaluated as "C (difficult to be used in practice when good film appearance is required)".

The estimation results are shown in Table 3 along with the manufacturing conditions of the can (polyester film, adhesive layer, Sn metal particles, amount of Ni plating, and amount of chromate film) Moreover, overall estimation (determined by the lowest estimation) with respect to the estimation items (1) to (3) and (6) was also performed.

As shown in Table 3, in all the can main bodies of Nos. 44 to 56, the weldability, the appearance, the film adhesiveness of the screw formed portion, and the corrosion resistance (resistance to filiform corrosion) were sufficient. Moreover, in all the can main bodies of Nos. 57 to 60 and 63, the weldability, the appearance, the film adhesiveness of the screw formed portion, and the corrosion resistance (resistance to filiform corrosion) were of a level which was not a problem in practical use.

However, in the can main bodies of Nos. 44 to 56, since the mean particle diameter of the Sn metal particles was controlled to be 2 μm or more, the corrosion resistance of the can body portion and the film appearance (film brightness) were more improved compared to the can main body of No. 57. Particularly, in the can main bodies of Nos. 45 to 46 and 50 to 56, since the mean particle diameter of the Sn metal particles was controlled to be 3 μm or more, the corrosion resistance of the can body portion and the film appearance (film brightness) were further improved compared to the can main body of No. 44.

Moreover, in the can main bodies of Nos. 44 to 56, since the mean particle diameter of the Sn metal particles was controlled to be 7 μm or less, the film adhesiveness of the screw formed portion and the film appearance (film brightness) were further improved compared to the can main body of No. 58. Particularly, in the can main bodies of Nos. 45 to 46 and 50 to 56, since the mean particle diameter of the Sn metal particles was controlled to be 6 μm or less, the film adhesiveness of the screw formed portion was further improved compared to the can main body of No. 44.

In addition, in the can main bodies of Nos. 44 to 56, since the amount of the Sn metal particles in the adhesive layer was controlled to be 100 mg/m² or more, the film adhesiveness of the screw formed portion and the film appearance (film brightness) were further improved compared to the can main body of No. 59. Particularly, in the can main bodies of Nos. 45 to 46 and 50 to 56, since the amount of the Sn metal particles in the adhesive layer was controlled to be 300 mg/m² or more, the corrosion resistance of the can body portion was further improved compared to the can main body of No. 48.

In addition, in the can main bodies of Nos. 44 to 56, since the amount of the Sn metal particles in the adhesive layer was controlled to be 3600 mg/m² or less, the film appearance (film brightness) and the film adhesiveness of the screw formed portion were further improved compared to the can main body of No. 60. Particularly, in the can main bodies of Nos. 45 to 46 and 50 to 56, since the amount of the Sn metal particles in the adhesive layer was controlled to be 2000 mg/m² or more, the corrosion resistance of the can body portion was further improved compared to the can main body of No. 49.

Moreover, in the can main bodies of Nos. 44 to 56, since the amount of chromate film of the can body member was more suitably controlled, the weldability of the can body member was further improved compared to the can main body of No. 63.

In this way, in the can main bodies of Nos. 45, 46, and 50 to 56 having a mean particle diameter and an amount of the Sn metal particles in the preferable range, all estimation items were improved.

In the can main body of No. 61, since the amount of metal plating in the welding portion of the can body member was not sufficient, the weldability of the can body member was not sufficient. In the can main body of No. 62, since the amount of chromate film of the can body member was not sufficient, the film adhesiveness of the screw formed portion and the corrosion resistance of the can body member were not sufficient.

TABLE 3

| | Can bottom member | | | | | Estimation results | | | | |
| --- | --- | --- | --- | --- | --- | --- | --- | --- | --- | --- |
| | | | Sn metal particles | | Amount | | Film | | | |
| No. | Film | Adhesive resin | Mean Particle diameter (μm) | Amount (mg/m²) | Amount of Ni plating (mg/m²) | of chromate film*¹ (mg/m²) | Weldability | Film appearance | adhesiveness in screw formed portion | Corrosion resistance*² | Overall rating |
| 44 | A | I | 2.4 | 1500 | 500 | 5 | A | B | A | B | B |
| 45 | A | II | 6.6 | 1500 | 500 | 5 | A | A | B | A | B |
| 46 | A | II | 3.5 | 1500 | 500 | 5 | A | A | A | A | A |
| 47 | A | II | 5.5 | 1500 | 500 | 5 | A | A | A | A | A |
| 48 | A | II | 4.0 | 200 | 500 | 5 | A | A | A | B | B |
| 49 | A | II | 4.0 | 3400 | 500 | 5 | A | B | B | A | B |
| 50 | A | II | 4.0 | 400 | 500 | 5 | A | A | A | A | A |
| 51 | A | II | 4.0 | 1800 | 500 | 5 | A | A | A | A | A |
| 52 | A | II | 4.0 | 1500 | 500 | 5 | A | A | A | A | A |
| 53 | A | II | 4.0 | 1500 | 260 | 5 | A | A | A | A | A |
| 54 | A | II | 4.0 | 1500 | 950 | 5 | A | A | A | A | A |
| 55 | B | II | 4.0 | 1500 | 500 | 3 | A | A | A | A | A |
| 56 | C | II | 4.0 | 1500 | 500 | 8 | A | A | A | A | A |
| 57 | A | II | 1.5 | 1500 | 500 | 5 | A | C | A | B | C |
| 58 | A | II | 8.0 | 1500 | 500 | 5 | A | B | C | A | C |
| 59 | A | II | 4.0 | 50 | 500 | 5 | A | A | A | C | C |
| 60 | A | II | 4.0 | 4000 | 500 | 5 | A | C | C | A | C |
| 61 | A | II | 4.0 | 1500 | 150 | 5 | D | A | A | B | D |
| 62 | A | II | 4.0 | 1500 | 500 | 1 | A | A | D | C | D |
| 63 | A | II | 4.0 | 1500 | 500 | 12 | C | A | A | A | C |

* Underlines in this table indicate that the underlined cells do not satisfy conditions according to the present invention.
*¹Amount of chromate film is equivalent to the amount in chromium metal.
*²"Corrosion resistance" indicates the corrosion resistance under severer conditions than those in Tables 1 and 2.

Therefore, it is considered that the can main bodies, which are improved in the estimation items (1) to (3), can be obtained when the can body members of Nos. 44 to 60 and 63 and the can bottom member which is manufactured from the Sn-plated steel sheet prepared according to any one of the manufacturing methods 4 to 6 are combined.

As described above, the preferred embodiments of the present invention are described. However, the present invention is not limited to the embodiments. It is obvious that various modifications or alterations can be conceived within the scope described in claims by a person skilled in the art, and the modifications and the alternations are also included in the technical scope of the present invention.

INDUSTRIAL APPLICABILITY

According to the present invention, the three-piece resealable can which has improved film adhesiveness and corrosion resistance and can store acidic liquid, particularly, acidic beverages such as fruit juice with high quality can be provided.

REFERENCE SYMBOL LIST

1: three-piece resealable can (can; resealable can)
2 (2A to 2F): can body member (can body; can body portion)
3 (3A to 3J): can bottom member (can bottom; can bottom portion; bottom cover; can cover)
4: cap
5: can main body
21: screw portion (screw formed portion)
22: welding portion
23: polyester film (organic film, PET film)
24: chromate film
25: Ni plating
26: steel sheet (sheet to be plated)
27: Sn plating
27A: Sn single metal plating (non-alloyed Sn plating)
27B: alloyed Sn plating
28: adhesive layer
28A: Sn metal particles
34: chromate film
35: Ni plating
36: steel sheet (sheet to be plated)
37: Sn plating
37A: Sn single metal plating (non-alloyed Sn plating)
37B: alloyed Sn plating

What is claimed is:

1. A can main body for a three-piece resealable can for acidic liquid, comprising:
a cylindrical can body member that includes a screw portion at one end; and
a can bottom member that contacts the can body member so as to close an opening portion of the other end of the can body member,
wherein the can body member includes:
a cylindrical first steel sheet,
a Ni plating that is formed on an inner circumferential surface of the first steel sheet,
a polyester film that is formed so as to be disposed on an outermost surface of an inner circumference of the can body member, and
a chromate film that is formed between the first steel sheet and the polyester film, wherein an amount of the Ni plating is 10 to 1000 mg/m$^2$, an amount of the chromate film is 2 to 30 mg/m$^2$ expressed in terms of Cr metal, and an amount of a metal plating which is closest to the outermost surface of the inner circumference of the can body member is 200 to 4000 mg/m$^2$,
wherein the can bottom member includes:
a second steel sheet, and
an Sn plating that is formed on the can body member side of the can bottom member, the Sn plating being on or above the second steel sheet,
wherein the Sn plating on or above the second steel sheet includes an Sn single metal plating in an amount of 2 to 20 g/m$^2$,
wherein a resistance between the can body member and the can bottom member is 1Ω or less, and
wherein a plating included in the can body member and a plating included in the can bottom member are different from each other.

2. The can main body for the three-piece resealable can for acidic liquid according to claim 1,
wherein an outermost surface on the can bottom member is the Sn plating formed on the can body member side.

3. The can main body for the three-piece resealable can for acidic liquid according to claim 1,
wherein the can bottom member further includes a chromate film which is formed on a surface of the Sn plating, an amount of the chromate film being 2 to 10 mg/m$^2$ expressed in terms of Cr metal, and an outermost surface of the can bottom member being the chromate film.

4. The can main body for the three-piece resealable can for acidic liquid according to claim 1,
wherein the Sn plating on or above the second steel sheet includes an alloyed Sn plating in an amount of 0.2 to 1.5 g/m$^2$.

5. The can main body for the three-piece resealable can for acidic liquid according to claim 1,
wherein the can bottom member further includes a Ni plating in an amount of 10 to 200 mg/m$^2$ which is formed on a surface on the can body member side of the second steel sheet.

6. The can main body for the three-piece resealable can for acidic liquid according to claim 1,
wherein the amount of Sn single metal plating is 8 to 16 g/m$^2$.

7. The can main body for the three-piece resealable can for acidic liquid according to claim 1,
wherein the amount of the Ni plating is 200 to 1000 mg/m$^2$ and the amount of the chromate film is 2 to 10 mg/m$^2$ expressed in terms of Cr metal.

8. The can main body for the three-piece resealable can for acidic liquid according to claim 1,
wherein the can body member further includes an Sn plating which is formed on a surface of the Ni plating, the Sn plating including an Sn single metal plating in 0.2 to 2 g/m$^2$ and an alloyed Sn plating, the amount of the Ni plating being 10 to 200 mg/m$^2$, and the amount of the chromate film being 10 to 30 mg/m$^2$.

9. The can main body for the three-piece resealable can for acidic liquid according to claim 1,
wherein the can body member further includes an adhesive layer between the chromate film and the polyester film.

10. The can main body for the three-piece resealable can for acidic liquid according to claim 9,
wherein the adhesive layer contains 100 to 3600 mg/m$^2$ of Sn metal particles having a mean particle diameter of 2 to 7 μm with respect to a surface area of the first steel sheet.

11. The can main body for the three-piece resealable can for acidic liquid according to claim 10,
wherein the mean particle diameter of the Sn metal particles is 3 to 6 μm.

12. The can main body for the three-piece resealable can for acidic liquid according to claim 10,
wherein the adhesive layer contains 300 to 2000 mg/m$^2$ of the Sn metal particles with respect to the surface area of the first steel sheet.

13. The can main body for the three-piece resealable can for acidic liquid according to claim 1,
   wherein the resistance between the can body member and the can bottom member is 0.1Ω or less.

14. A three-piece resealable can for acidic liquid, comprising the can main body of claim 1 and a cap.

* * * * *

UNITED STATES PATENT AND TRADEMARK OFFICE
CERTIFICATE OF CORRECTION

PATENT NO.         : 9,061,787 B2
APPLICATION NO.    : 13/817061
DATED              : June 23, 2015
INVENTOR(S)        : Shigeru Hirano et al.

Page 1 of 1

It is certified that error appears in the above-identified patent and that said Letters Patent is hereby corrected as shown below:

Specification

Column 1, line 11, change "which claims priority to priority is claimed on Japanese" to -- which claims priority to Japanese --.

Signed and Sealed this
First Day of March, 2016

Michelle K. Lee
*Director of the United States Patent and Trademark Office*